US007445325B2

(12) United States Patent
Aikawa et al.

(10) Patent No.: US 7,445,325 B2
(45) **Date of Patent: *Nov. 4, 2008**

(54) INK TANK, INK JET RECORDING METHOD, AND INK TANK REGENERATION PROCESS

(75) Inventors: Yoshihide Aikawa, Yokohama (JP); Kuniaki Fujimoto, Tokyo (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

This patent is subject to a terminal disclaimer.

(21) Appl. No.: 11/342,595

(22) Filed: Jan. 31, 2006

(65) Prior Publication Data

US 2006/0125896 A1 Jun. 15, 2006

Related U.S. Application Data

(63) Continuation of application No. PCT/JP2005/014604, filed on Aug. 3, 2005.

(30) Foreign Application Priority Data

Aug. 4, 2004 (JP) ............................ 2004-228230
Aug. 2, 2005 (JP) ............................ 2005-224240

(51) Int. Cl.
*G01D 11/00* (2006.01)

(52) U.S. Cl. ............................ 347/100; 347/95; 347/86

(58) Field of Classification Search ................. 347/100, 347/95, 96, 101, 86, 85; 106/31.6, 31.13, 106/31.27; 523/160
See application file for complete search history.

(56) References Cited

U.S. PATENT DOCUMENTS 4,202,870 A 5/1980 Weber et al. ................ 423/630
4,242,271 A 12/1980 Weber et al. .......... 260/448 AD
4,248,852 A 2/1981 Wakabayashi et al. ...... 423/626
4,723,129 A 2/1988 Endo et al. .................. 346/1.1
4,740,796 A 4/1988 Endo et al. .................. 346/1.1
5,091,009 A 2/1992 Nogami et al. ........... 106/287.1
5,221,497 A 6/1993 Watanabe et al. ........ 252/313.2
5,495,272 A 2/1996 Yamaguchi .................. 347/28
6,387,168 B1 5/2002 Koitabashi et al. ......... 106/31.6
6,976,755 B2 12/2005 Sato et al. .................. 347/100

(Continued)

FOREIGN PATENT DOCUMENTS

EP 1 626 070 A1 2/2006

(Continued)

OTHER PUBLICATIONS

Jul. 22, 2008 European Search Report in European Patent Appln. No. 05780273.8.

*Primary Examiner*—Manish S Shah
(74) *Attorney, Agent, or Firm*—Fitzpatrick, Cella, Harper & Scinto

(57) ABSTRACT

The present invention aims to provide an ink tank which can elongate the lifetime of ink jet recording apparatus and further stores therein an ink which can achieve superior image characteristics such as image fastness. The present invention provides an ink tank which includes an ink storage portion storing an aqueous ink therein, having fine channels which retain the aqueous ink by capillary force, wherein the aqueous ink includes at least water and a water-soluble coloring material, and further includes a compound satisfying specific requirements.

14 Claims, 8 Drawing Sheets

U.S. PATENT DOCUMENTS

| | | | | |
|---|---|---|---|---|
| 7,015,327 | B2 | 3/2006 | Matsumoto et al. | 546/76 |
| 7,128,779 | B2 | 10/2006 | Osumi et al. | 106/31.52 |
| 7,144,449 | B2 | 12/2006 | Udagawa et al. | 106/31.15 |
| 7,285,159 | B2 * | 10/2007 | Aikawa et al. | 347/100 |
| 2003/0116059 | A1 * | 6/2003 | Nguyen et al. | 106/31.47 |
| 2005/0005818 | A1 | 1/2005 | Sato et al. | 106/31.27 |
| 2005/0088501 | A1 | 4/2005 | Nagashima et al. | 347/100 |
| 2005/0131104 | A1 | 6/2005 | Aikawa et al. | 523/160 |
| 2005/0171351 | A1 | 8/2005 | Matsumoto et al. | 546/76 |
| 2006/0007288 | A1 | 1/2006 | Takada et al. | 347/100 |
| 2006/0012657 | A1 | 1/2006 | Nagashima et al. | 347/100 |
| 2006/0096498 | A1 | 5/2006 | Tsujimura et al. | 106/31.27 |
| 2006/0098067 | A1 | 5/2006 | Imai et al. | 347/100 |
| 2006/0098068 | A1 | 5/2006 | Hakamada et al. | 347/100 |
| 2006/0100311 | A1 | 5/2006 | Tokuda et al. | 523/160 |
| 2006/0103703 | A1 | 5/2006 | Nito et al. | 347/100 |
| 2006/0103704 | A1 | 5/2006 | Hakamada et al. | 347/100 |
| 2006/0103706 | A1 | 5/2006 | Aikawa et al. | 347/100 |
| 2006/0109324 | A1 | 5/2006 | Fujimoto et al. | 347/100 |
| 2006/0137570 | A1 | 6/2006 | Osumi et al. | 106/31.27 |
| 2006/0139428 | A1 | 6/2006 | Osumi et al. | 347/100 |
| 2006/0139429 | A1 | 6/2006 | Osumi et al. | 347/100 |
| 2006/0142417 | A1 | 6/2006 | Kaneko et al. | 523/160 |
| 2006/0152570 | A1 | 7/2006 | Ishikawa et al. | 347/105 |
| 2006/0192827 | A1 | 8/2006 | Takada et al. | 347/100 |
| 2006/0194056 | A1 | 8/2006 | Nagashima et al. | 428/403 |
| 2006/0194897 | A1 | 8/2006 | Kawabe et al. | 523/160 |
| 2007/0029522 | A1 | 2/2007 | Udagawa et al. | 252/301.16 |

FOREIGN PATENT DOCUMENTS

| | | | |
|---|---|---|---|
| EP | 1626069 | * | 2/2006 |
| JP | 57-44605 | | 3/1982 |
| JP | 5-19467 | | 1/1993 |
| JP | 6-8471 | | 1/1994 |
| JP | 2803134 | | 7/1998 |
| JP | 2881847 | | 2/1999 |
| JP | 2001-517209 | | 10/2001 |
| JP | 2002-332419 | | 11/2002 |
| JP | 2003-192930 | | 7/2003 |
| JP | 2004-9716 | | 1/2004 |
| JP | 2004-122672 | | 4/2004 |
| WO | WO 2004/104107 | * | 12/2004 |
| WO | WO 2004/104108 | | 12/2004 |

* cited by examiner

INK TANK, INK JET RECORDING METHOD, AND INK TANK REGENERATION PROCESS

This application is a continuation of International Application No. PCT/JP2005/014604, filed Aug. 3, 2005, which claims the benefit of Japanese Patent Application Nos. 2004-228230 filed Aug. 4, 2004 and 2005-224240 filed Aug. 2, 2005.

BACKGROUND OF THE INVENTION

1. Field of the Invention

This invention relates to an ink tank having taken account of the correlation between an aqueous ink and an ink tank (inclusive of an ink tank with a recording head) which stores the aqueous ink therein in order to feed the same, and relates to a process for regenerating the ink tank. More particularly, it relates to an ink tank used in an ink jet recording method, and a process for regenerating such an ink tank.

2. Related Background Art

The ink jet recording method is a recording method involving applying a small ink droplet to any one of recording media such as plain paper and glossy media to form images, and has become rapidly widespread owing to a reduction in its cost and an improvement in its recording speed. Also, recorded materials thereby obtainable have made progress toward high image quality and in addition thereto digital cameras have rapidly come into wide use, users of ink jet printers now demand to output recorded materials which are comparable to silver halide photographs.

What is given as one requirement for how the recorded materials obtained by the ink jet recording method is comparable to silver halide photographs is that the recorded materials have a high fastness. Conventional ink jet recorded materials have a lower fastness than the silver halide photographs. Hence, there is a problem that, where recorded materials are exposed to light, humidity, heat, environmental gases present in air, and so forth for a long time, coloring materials on the recorded materials tend to deteriorate to cause changes in color tones or discoloration of images, i.e., the recorded materials have a low fastness. Many studies have been made in order to solve such a problem.

For example, a proposal is made in which the fastness is improved by the use of a coloring material having an anthrapyridone structure (see, e.g., Japanese Patent Application Laid-Open No. 2002-332419 and No. 2003-192930).

In recent years, it is also seen that a container called a refill kit whose ink tank in which an ink stored therein has been used and the ink stands used up is again filled with an ink is used by general users. As a countermeasure against environmental problems in recent years, the state of ink consumption is recorded in an information storage means such as a memory, or recorded in an ink tank itself. Such methods are known in the art (see, e.g., Japanese Patent Publication No. H05-019467 and No. 2004-009716). It is also put into practice that ink tanks in which inks have been used up are recycled.

SUMMARY OF THE INVENTION

Usually, inks are used in the state they are stored in ink tanks mounted to recording heads or in ink tanks to which nozzles are connected. Also, the properties of inks have been designed taking account of only the performance as inks.

The present inventors have found that, in an ink having been so designed as to have superior properties in respect of, e.g., image fastness, a problem as stated below comes about after the ink stored in an ink tank has been used up. That is, as the ink has more superior properties, a phenomenon in which components constituting the ink come deposited in the interior of the ink tank may more occur due to the fact that the properties the ink should originally bring out in the recorded materials are brought out in the interior of the ink tank standing after the ink has been used up (hereinafter also called the state of "use-up") . It has further been found that it is impossible for general users to re-dissolve such deposits to use the ink tank again. This means more specifically that the deposits having developed in the interior of the ink tank cannot be re-dissolved when refill inks are used by general users not for the purpose of business but for private use. That is, it is difficult to achieve satisfactory ink jet performance or image forming performance by the use of ink tanks in which such deposits have developed. In particular, where an ink tank is used in which an ink storage portion storing an aqueous ink therein has fine channels which retain the aqueous ink by capillary force (or a negative-pressure generation member), the following phenomenon occurs. That is, the fine channels (or a negative-pressure generation member) retain the ink by capillary force also after the ink stored in the ink tank has been used up. Hence, the deposits coming about in the interior of the ink tank are in a large quantity to especially come into question.

In such a case, a waste of the time and labor taken by general users to refill empty tanks with inks, and also a waste of inks themselves used as refills and further the disposal of ink tanks refilled with unusable inks bring about a waste of resources and environmental pollution. In particular, where a general user who has wrongly recognized that an ink tank refilled with an ink is usable in the same way as new one attaches the ink tank to an ink jet recording apparatus and put it to use, the following problem may come about. That is, the recording head is operated in the state that faulty ink feeding has occurred because of the deposits present in the interior of the ink tank, to cause a problem that the recording head comes to have a short lifetime, and, when the recording head is restored by suction, such suction restoration is performed also in respect of inks stored in other ink tanks mounted to the ink jet recording apparatus simultaneously with that ink tank, to cause a problem that the inks are consumed in a large quantity. Such problems may cooperatively come about.

Accordingly, the present inventors have taken note of how the deposits are made not to develop when the ink tank storing therein the ink like that stated above has come into "use-up", i.e., how the ink remaining in the ink tank is retained in the state of a liquid as far as possible. This is because, as long as the ink remaining in the ink tank is in the state of a liquid, the deposits can be kept from developing, compared with a case in which the ink is not in the state of a liquid (e.g., it is in the state an aqueous medium constituting the ink has evaporated) . In order to retain the ink in the state of a liquid as far as possible, it may be contemplated that, e.g., in ink composition, the ink is so made up that a water-soluble organic solvent which is capable of highly dissolving compounds tending to form deposits and has a large non-volatility may be used in a large content to make the deposits not easily develop, or that the ink tank may be so set up as to be highly hermetic to make volatile components in inks not easily evaporate.

However, it has been ascertained that, even though such measures are taken, the deposits develop where the ink tank is kept in, e.g., leaving for a long term after the ink stored in the ink tank has been used up.

Meanwhile, it is preferable if the ink tank in the interior of which the deposits as stated above develop can be regenerated by any method, because this makes it possible to reuse the ink tank regenerated. Also, this ink tank regenerated may be refilled with an ink, making it possible to provide an ink tank anew as merchandise.

Accordingly, a first object of the present invention is to provide an ink tank which can elongate the lifetime of ink jet recording apparatus and further stores therein an ink which can achieve superior image characteristics such as image fastness.

A second object of the present invention is to provide an ink tank regeneration process which enables regeneration of an ink tank in the interior of which the deposits develop when, e.g., left after the ink has been used up.

A third object of the present invention is to provide an ink jet recording method making use of such an ink tank.

The above objects are achieved by the invention described below. That is, the ink tank according to the first object of the present invention is an ink tank which comprises an ink storage portion storing an aqueous ink therein, having fine channels which retain the aqueous ink by capillary force, wherein;

the aqueous ink comprises at least water and a water-soluble coloring material, and the aqueous ink further comprises a compound satisfying the following requirements (1) to (4):

Requirement (1): a molecular weight of the compound is less than a molecular weight of the water-soluble coloring material;

Requirement (2): part of molecular structure of the compound is similar to part of molecular structure of the water-soluble coloring material;

Requirement (3): the number of carboxyl groups per molecule of the compound is more than the number of carboxyl groups per molecule of the water-soluble coloring material; and Requirement (4): a solubility of the compound in pure water with pH 7 at 25° C. is lower than the solubility of the water-soluble coloring material in pure water with pH 7 at 25° C.

Another embodiment of the ink tank according to the first object of the present invention is an ink tank which comprises an ink storage portion storing an aqueous ink therein, having fine channels which retain the aqueous ink by capillary force, wherein;

the aqueous ink comprises at least water and a water-soluble coloring material, and the water-soluble coloring material comprises a compound represented by the following general formula (I) or a salt thereof; and the aqueous ink further comprising a compound represented by the following general formula (II).

General formula (I)

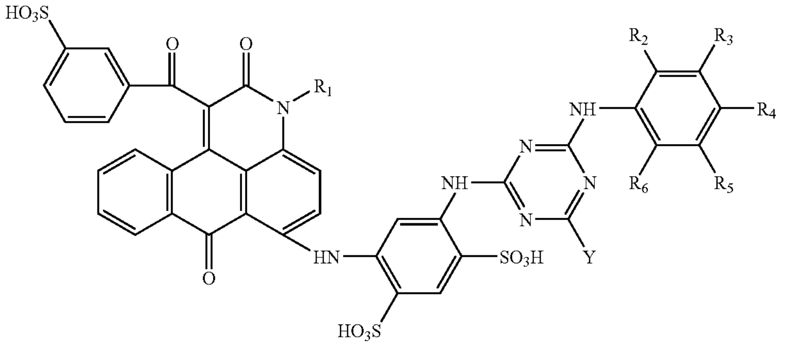

(In the general formula (I), $R_1$ represents a hydrogen atom, an alkyl group, a hydroxy lower alkyl group, a cyclohexyl group, a monoalkylaminoalkyl or dialkylaminoalkyl group, or a cyano lower alkyl group; Y represents a chlorine atom, a hydroxyl group, an amino group, or a monoalkylamino or dialkylamino group which may have a substituent selected from the group consisting of a sulfonic group, a carboxyl group and a hydroxyl group on an alkyl group; and $R_2$, $R_3$, $R_4$, $R_5$ and $R_6$ each independently represent a hydrogen atom, an alkyl group having 1 to 8 carbon atoms, or a carboxyl group, provided that $R_2$, $R_3$, $R_4$, $R_5$ and $R_6$ cannot simultaneously represent hydrogen atoms.)

General formula (II)

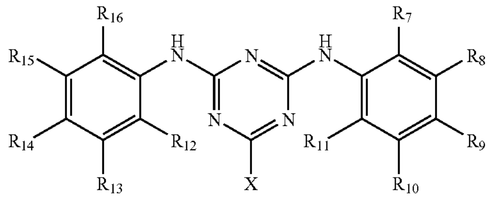

(In the general formula (II), $R_7$, $R_8$, $R_9$, $R_{10}$, $R_{11}$, $R_{12}$, $R_{13}$, $R_{14}$, $R_{15}$ and $R_{16}$ each independently represent a hydrogen atom, an alkyl group having 1 to 3 carbon atoms, or a carboxyl group or a salt thereof, provided that at least two of the $R_7$, $R_8$, $R_9$, $R_{10}$, $R_{11}$, R12, $R_{13}$, $R_{14}$, $R_{15}$ and $R_{16}$ are carboxyl groups or salts thereof; and X represents a chlorine atom, a hydroxyl group, an amino group, or a monoalkylamino or dialkylamino group having 1 to 3 carbon atoms.)

Still another embodiment of the ink tank according to the first object of the present invention is an ink tank which comprises an ink storage portion storing an aqueous ink therein, having fine channels which retain the aqueous ink by capillary force, wherein;

the aqueous ink comprises at least water and a water-soluble coloring material, and the aqueous ink further comprises a compound represented by the following general formula (II).

General formula (II)

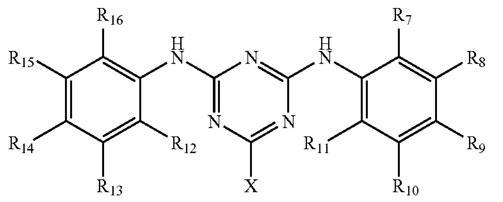

(In the general formula (II), $R_7$, $R_8$, $R_9$, $R_{10}$, $R_{11}$, $R_{12}$, $R_{13}$, $R_{14}$, $R_{15}$ and $R_{16}$ each independently represent a hydrogen atom, an alkyl group having 1 to 3 carbon atoms, or a carboxyl group or a salt thereof, provided that at least two of the $R_7$, $R_8$, $R_9$, $R_{10}$, $R_{11}$, $R_{12}$, $R_{13}$, $R_{14}$, $R_{15}$ and $R_{16}$ are carboxyl groups or salts thereof; and X represents a chlorine atom, a hydroxyl group, an amino group, or a monoalkylamino or dialkylamino group having 1 to 3 carbon atoms.)

The ink tank regeneration process according to the second object of the present invention is an ink tank regeneration process for regenerating an ink tank which comprises an ink storage portion storing an aqueous ink therein, having fine channels which retain the aqueous ink by capillary force;

the aqueous ink comprising at least water and a water-soluble coloring material, and the aqueous ink further comprising, as a compound satisfying the following requirements (1) and (2), a compound represented by the following general formula (II); and the process comprising a dissolution step of dissolving the compound, which has come deposited in the interior of the ink tank, by the use of an aqueous solution having a pH of 10.0 or more.

Requirement (1): a molecular weight of the compound represented by the general formula (II) is less than a molecular weight of the water-soluble coloring material; and Requirement (2): the compound represented by the general formula (II) has lower solubility in pure water with pH 7 at 25° C., than the water-soluble coloring material.

General formula (II)

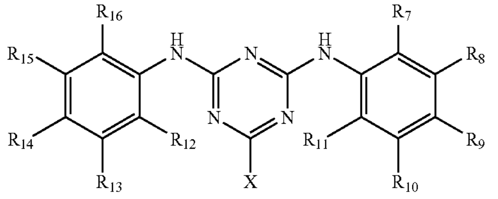

(In the general formula (II), $R_7$, $R_8$, $R_9$, $R_{10}$, $R_{11}$, $R_{12}$, $R_{13}$, $R_{14}$, $R_{15}$ and $R_{16}$ each independently represent a hydrogen atom, an alkyl group having 1 to 3 carbon atoms, or a carboxyl group or a salt thereof, provided that at least two of the $R_7$, $R_8$, $R_9$, $R_{10}$, $R_{11}$, $R_{12}$, $R_{13}$, $R_{14}$, $R_{15}$ and $R_{16}$ are carboxyl groups or salts thereof; and X represents a chlorine atom, a hydroxyl group, an amino group, or a monoalkylamino or dialkylamino group having 1 to 3 carbon atoms.)

The ink jet recording method according to the third object of the present invention is an ink jet recording method which comprises the step of ejecting an ink by ink jet method, wherein;

the ink is the aqueous ink stored in an ink storage portion of the ink tank constituted as described above.

Another embodiment of the ink jet recording method according to the third object of the present invention is an ink jet recording method which comprises the step of ejecting an ink by ink jet method, wherein the ink is the aqueous ink stored in an ink storage portion of the ink tank regenerated by the ink tank regeneration process constituted as described above.

According to the first-category invention according to the first object of the present invention, it can provide an ink tank which can elongate the lifetime of ink jet recording apparatus and further stores therein an ink which can achieve superior image characteristics such as image fastness. Also, according to the second-category invention according to the second object of the present invention, it can provide an ink tank regeneration process which enables regeneration of an ink tank in the interior of which the deposits develop when, e.g., left after the ink has been used up. Still also, according to the third-category invention according to the third object of the present invention, it can provide an ink jet recording method making use of such an ink tank.

DETAILED DESCRIPTION OF THE PREFERRED EMBODIMENTS

Figure 1:
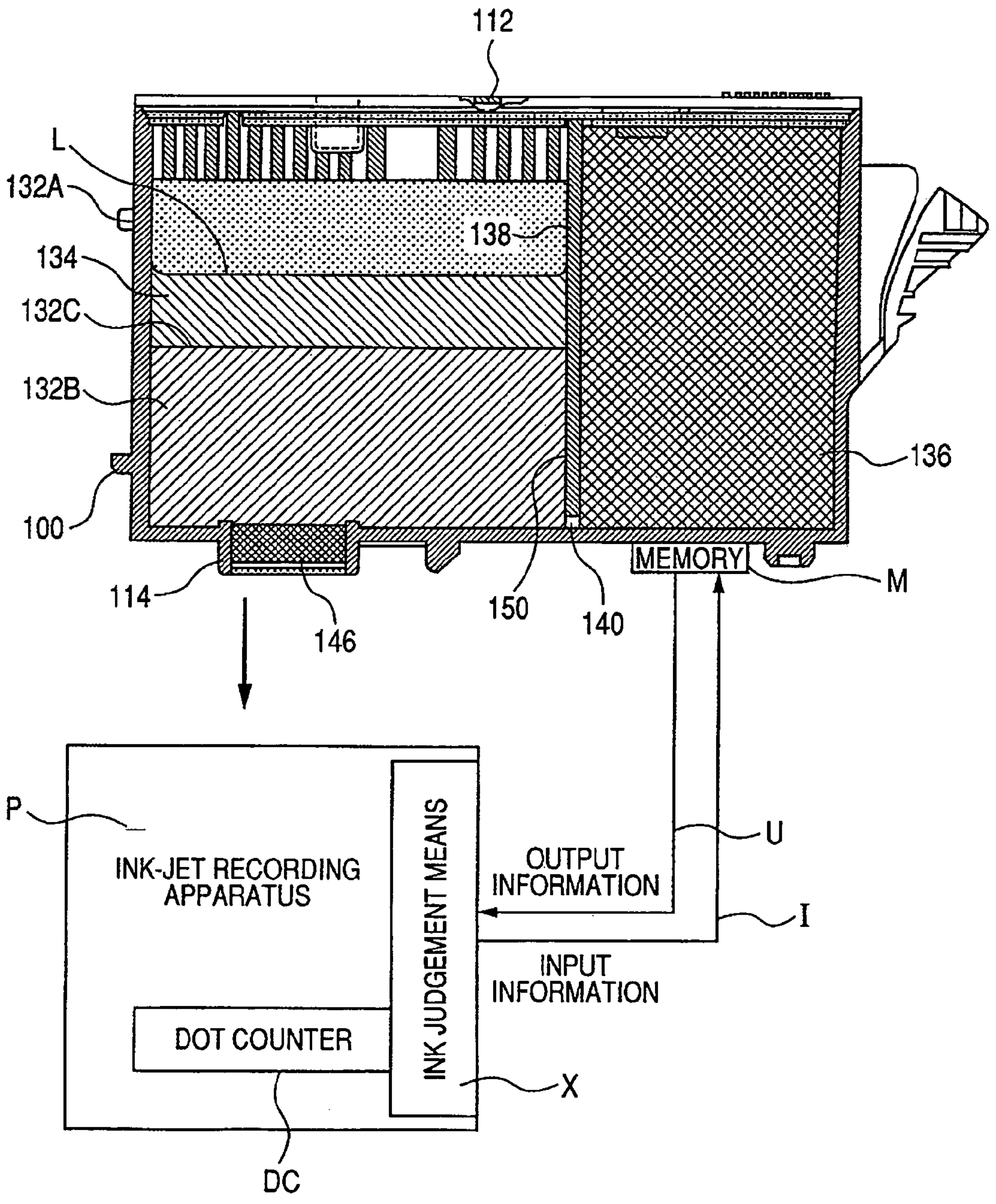
FIG. 1 is a schematic illustration of an ink tank which has an absorber member as a negative-pressure generation mechanism at some part of an ink storage portion and, mounted thereto, a chip having memory function.

The present invention is described below in greater detail by giving preferred embodiments.

Incidentally, in the present invention, where a compound is a salt, the salt is present in the ink in the state it has dissociated in ions. For convenience, this is expressed as "contains a salt".

The present invention is effective when applied to general ink tanks and to recording in general which makes use of the same. In particular, it is effective, and hence is preferable, especially when applied to an ink tank used in an ink jet recording method. The present invention is described below in respect of a case in which the ink of the present invention is used as an ink for ink jet recording.

The state of "use-up" referred to in the present invention embraces a state in which an ink remaining in the interior of an ink tank is retained at so strong a capillary force that the ink can not be fed even when the ink tank is mounted to an ink jet recording apparatus or the like, and a state in which the ink tank has been kept in, e.g., leaving for so long a term that part of the ink has come deposited to make it substantially difficult for the ink tank to be used.

In the present invention, the ink tank is characterized by retaining an aqueous ink by capillary force. The capillary force lasts through a state in which the ink tank is filled with an ink in a sufficient quantity until it has come to the state of "use-up". That is, the fine channels or negative-pressure generation member always retain(s) the ink in a stated quantity without regard to whether or not the ink stored in the ink tank can be used. Hence, it follows that the fine channels or negative-pressure generation member retain(s) the ink in a stated quantity by capillary force even in a state in which the ink tank can not feed the ink, i.e., in the state of "use-up".

<Technical Idea of the Invention>

In conventional inks having relatively low properties in respect of, e.g., image fastness, any deposits which might come from components such as a water-soluble coloring material and additives by no means develop during the use of the ink as a matter of course and also in the interior of the ink tank in which the ink has been used up. Any particular difficulties have not come about in feeding the ink, even when the ink tank in which the ink has been used up is refilled with an ink and put to reuse.

However, where an ink having been so designed that its properties in respect of, e.g., image fastness may come to a stated level or more is used in the state it is stored in an ink tank having fine channels which retain the ink by capillary force even in the state of "use-up", the following problem has come about. That is, the ink tank is usable without any problem while the ink has remained in a sufficient volume, but deposits coming from components such as a water-soluble coloring material and additives develop in the interior of the ink tank when the ink tank is left for a long term in the state it is taken out of an ink jet recording apparatus. The development of such deposits has never occurred when conventional inks are stored in the above ink tank, and hence the development of such deposits has never been predictable from conventional circumstances. Then, the deposits have mostly developed in the fine channels which retain the ink by capillary force in the interior of an ink storage portion, and the deposits have been found strongly stuck to the fine channels retaining the ink.

Where the phenomenon stated above occurs, the deposits may make the fine channels become clogged to cause an increase in the negative pressure that is generated in the interior of the ink tank. If the ink tank is refilled with an ink in such a state and reused, the force at which the ink is retained in the fine channels becomes so large that the recording may be operated in the state the force to feed the ink to a recording head is insufficient. As the result, this brings about the problem that the recording head comes to have a short lifetime. Also, when the recording head is recovered by purging, such purging recovery is performed also in respect of inks stored in other ink tanks mounted to the ink jet recording apparatus simultaneously with that ink tank, to cause the problem that the inks are consumed in a large quantity.

While such problems come about, a case may come about in which the capillary force that is originally required comes no longer obtainable at the part where the fine channels have become clogged because of the presence of the deposits. As the result, the negative pressure decreases to make the ink fed unstably in some cases. This phenomenon comes into question especially when, in an ink tank comprising an ink storage portion having a plurality of structurally different fine-channel structures, the deposits develop in the vicinities of faces at which the structurally different fine-channel structures are kept in contact with one another. That is, it is not preferable that the scattering of negative pressure is present in such fine channel structures of the ink tank.

The present inventors have further ascertained that, since the deposits stick strongly to the fine channels retaining the ink, it is impossible to re-dissolve the deposits even if the ink tank is washed with water or the like available for general users.

The present inventors have analyzed the deposits which develop in the interior of the ink tank. As the result, it has been found that the deposits are chiefly composed of a compound added to the ink in order to improve image fastness, namely, a substance coming from a compound which improves image fastness. The present inventors have analyzed in detail the relation between the structure of the compound which improves image fastness and the water-soluble coloring material incorporated in the ink. As the result, the following four requirements have come to light.

Requirement (1): the molecular weight of the compound which improves image fastness is less than the molecular weight of the water-soluble coloring material;

Requirement (2): part of molecular structure of the compound which improves image fastness is similar to part of molecular structure of the water-soluble coloring material;

Requirement (3): the number of carboxyl groups per molecule of the compound which improves image fastness is more than the number of carboxyl groups per molecule of the water-soluble coloring material; and Requirement (4): the solubility of the compound which improves image fastness, in pure water with pH 7 at 25° C. is lower than the solubility of the water-soluble coloring material in pure water with pH 7 at 25° C.

That is, it means that the ink containing the compound and water-soluble coloring material that satisfy these four requirements has a very good image fastness, and it means that the ink tank storing therein the ink containing the compound and water-soluble coloring material that satisfy these four requirements can achieve a very good image fastness.

However, even where the deposits are not compounds coming from the compound added to the ink in order to improve the image fastness, the following cases fall under the present invention. That is, such cases are (1) the molecular weight of the deposits is less than the molecular weight of the water-soluble coloring material, (2) part of molecular structure of the deposits is similar to part of molecular structure of the water-soluble coloring material, (3) the number of carboxyl groups per molecule of the deposits is more than the number of carboxyl groups per molecule of the water-soluble coloring material, and (4) the solubility of the deposits in pure water with pH 7 at 25° C. is lower than the solubility of the water-soluble coloring material in pure water with pH 7 at 25° C.

Here, the relations of the above requirements (1) to (4) are described from the viewpoint of the function of the ink. As to the requirement (1), it is presumed that, inasmuch as the molecular weight of the compound which improves image fastness is set less than the molecular weight of the water-soluble coloring material, difficulties can be kept from coming about when the ink is used. As to the requirement (2), it is also presumed that, inasmuch as part of molecular structure of the compound which improves image fastness is similar to part of molecular structure of the water-soluble coloring material, the compound which improves image fastness and the water-soluble coloring material are improved in their affinity for each other and hence are not mutually adversely affected, so that an ink having a good ink storage stability (or ejection performance in ink jet method) can be obtained. As to the requirements (3) and (4), it is also presumed that, after ink droplets have impacted on a recording medium, the water content in the ink decreases or the pH of the ink is brought to the acid side, whereby the compound having carboxyl groups in a large number in the molecule, i.e., the compound which improves image fastness predominantly comes deposited and present in the vicinity of the surface of the recording medium, and this enables improvement in image fastness. That is, the compound which improves image fastness can have the function to protect the water-soluble coloring material to enable control of the decomposition or the like of the water-soluble coloring material, and hence this brings an improvement in image fastness. Thus, the requirements (1) to (4) act favorably on the improvement in image fastness when the ink is used or when images are formed on the recording medium.

Meanwhile, the relations of the requirements (1) to (4) are described from the viewpoint of the function of the ink tank. In the interior of the ink tank standing after the ink has been used up, the ink remaining in the interior of the ink tank abruptly have much opportunity to come into contact with the surrounding air, because of the relations of the requirements (3) and (4). As the result, the water content decreases abruptly in the interior of the ink tank, and further the ink remaining in the interior of the ink tank absorbs vicinal carbon dioxide and so forth. Hence, the pH of the ink is brought to the acid side, and hence the compound which improves image fastness comes deposited in the interior of the ink tank. Also, because of the requirement (2), once the compound which improves image fastness has come deposited in the interior of the ink tank, the water-soluble coloring material having the structure similar to part of molecular structure of the compound which improves image fastness also comes deposited together in the interior of the ink tank. Further, because of the requirement (4), it is difficult to remove the deposits even if the ink tank is washed with water or the like available for general users. Thus, it is difficult to achieve sufficient ink jet performance by the use of the ink tank storing therein the ink having the properties like those stated above.

Therefore, the present inventors have come to the conclusion that it is best for the ink tank storing therein the ink having the above relations, to be used up, without being refilled with ink, i.e., to be used only once.

<Ink Tank>

Figure 2:
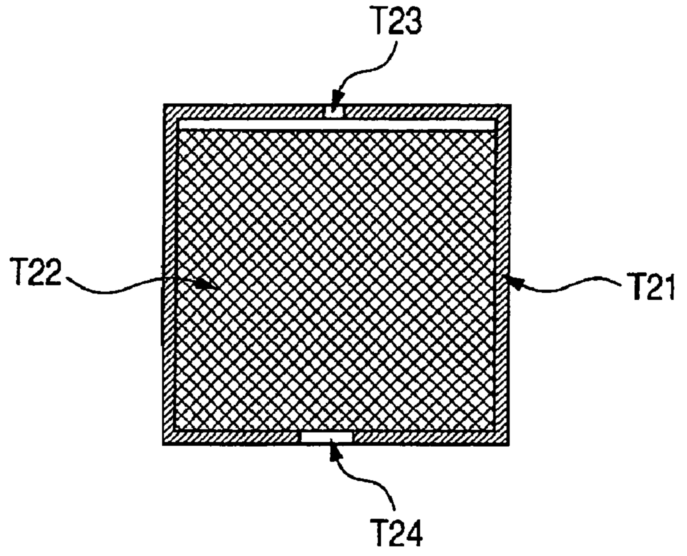
FIG. 2 illustrates an internal structure of an ink tank having an absorber member as a negative-pressure generation mechanism in the whole of an ink storage portion.
Figure 3:
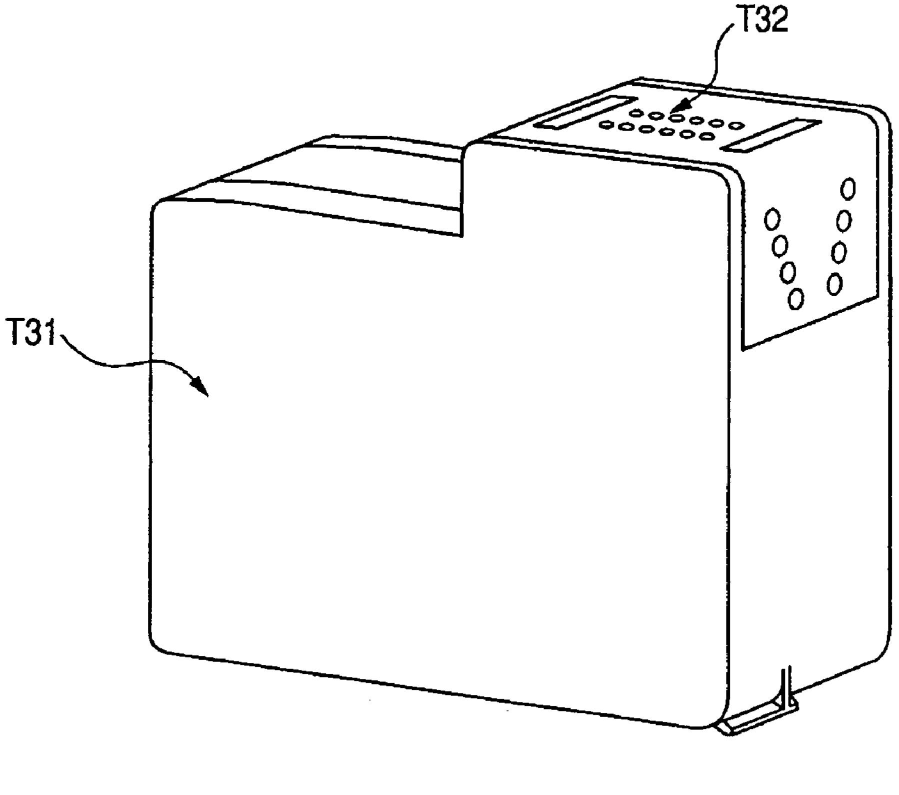
FIG. 3 is an external-appearance perspective view of an ink tank to which nozzles are connected.

The ink tank of the present invention may have forms as exemplified by a form in which as shown in FIG. 1 it has a negative-pressure generation mechanism at some part of its ink storage portion, or a form in which as shown in FIG. 2 it has a negative-pressure generation mechanism in the whole of its ink storage portion, and further a form in which as shown in FIG. 3, it has nozzles through which the ink is ejected. It may also be constructed in combination of the both.

FIG. 1 is a schematic illustration of an ink tank having an absorber member as a negative-pressure generation mechanism at some part of an ink storage portion. As shown in FIG. 1, an ink tank 100 has a structure in which it is partitioned with a partition wall 138 into i) a negative-pressure generation member holding chamber 134 which communicates the atmosphere at its upper part through an atmosphere communication opening 112, communicates an ink feed opening at its lower part and holds a negative-pressure generation member in its interior, and ii) a liquid-storing chamber 136 kept substantially tightly closed which stores therein a liquid ink. The negative-pressure generation member holding chamber 134 and the liquid-storing chamber 136 are made to communicate with each other only through a communicating part 140 formed in the partition wall 138 in the vicinity of the bottom of the ink tank 100 and an air lead-in path 150 for helping the air to be readily led in the liquid-storing chamber at the time of liquid-feeding operation. At the top wall of the ink tank 100 at its part where the negative-pressure generation member holding chamber 134 is formed, a plurality of ribs are integrally formed in such a form that they protrude inward, and come into contact with the negative-pressure generation member held in the negative-pressure generation member holding chamber 134 in a compressed state. In virtue of the ribs, an air buffer chamber is formed between the top wall and the upper surface of the negative-pressure generation member. Also, an ink feed barrel having the ink feed opening 114 is provided with a pressure contact member 146 having a higher capillary force and a stronger physical strength than the negative-pressure generation member, and is kept in pressure contact with the negative-pressure generation member.

The negative-pressure generation member holding chamber 134 holds therein as the negative-pressure generation member two capillary force generation type negative-pressure generation members, i.e., a first negative-pressure generation member 132B and a second negative-pressure generation member 132A which are formed of fibers of an olefin type resin such as polyethylene. Reference numeral 132C denotes a boundary layer of these two negative-pressure generation members, and the part where the boundary layer 132C and the partition wall 138 cross is present at an upper part than the top end of the air lead-in path 150 in a posture kept when the liquid-storing container is in use with its communicating part down. Also, the ink stored in the negative-pressure generation member is present up to an upper part than the boundary layer 132C as shown by a liquid level L of the ink.

Here, the boundary layer between the first negative-pressure generation member 132B and the second negative-pressure generation member 132A is kept in pressure contact with these members, and the boundary layer has, in its vicinities of these negative-pressure generation members, a higher compressibility than the other portions to come into a state that it has a strong capillary force. More specifically, where the capillary force the first negative-pressure generation member 132B has is represented by P1, the capillary force the second negative-pressure generation member 132A has by P2, and the capillary force these negative-pressure generation members have each other at their interfaces by PS, it stands P2<P1<PS.

In the ink stored in the ink tank of the present invention, especially where the ink tank is the ink tank having the form shown in FIG. 1, the deposits develop in the vicinity of the boundary layer 132C between the first negative-pressure generation member 132B and the second negative-pressure generation member 132A, whereupon the negative-pressure generation members comes to have a small negative pressure to make the feed of ink unstable in some cases.

FIG. 2 is a schematic illustration of an ink tank having an absorber member as a negative-pressure generation mechanism in the whole of an ink storage portion. The ink tank having the form shown in FIG. 2 is an ink tank in the interior The ink tank of the present invention may also have information means for judging the state of "use-up". In this case, an ink jet recording apparatus having such an ink tank may have an inhibit mode which performs no recording on the basis of information on the ink tank standing used up.

<Aqueous Ink>

The present inventors have revealed that, where the ink tank having fine channels which retains an aqueous ink by capillary force holds therein a specific aqueous ink, good ink jet performance is achieved in a usual use condition and the addition of the compound which improves image fastness brings an improvement in image fastness, but, after the ink has been used up, deposits develop in the interior of the ink tank, in particular, in the fine channels, and the fine channels become clogged.

Such a specific aqueous ink is that which contains water and, as a water-soluble coloring material, a compound represented by the following general formula (I) or a salt thereof and also contains a compound satisfying the following requirements (1) to (4):

Requirement (1): the molecular weight of the compound which improves image fastness is less than the molecular weight of the water-soluble coloring material;

Requirement (2): part of molecular structure of the compound which improves image fastness is similar to part of molecular structure of the water-soluble coloring material;

Requirement (3): the number of carboxyl groups per molecule of the compound which improves image fastness is more than the number of carboxyl groups per molecule of the water-soluble coloring material; and Requirement (4): the solubility of the compound which improves image fastness, in pure water with pH7 at 25° C. is lower than the solubility of the water-soluble coloring material in pure water with pH7 at 25° C.

General formula (I)

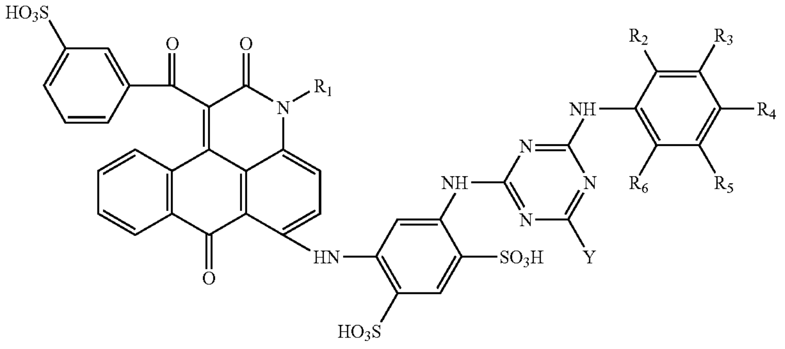

of which an absorber member (shown by network lines in the drawing) T22 such as a sponge as a negative-pressure generation mechanism is substantially all over disposed, and which stores therein an ink to be fed to an ink jet recording head, in the state the ink is stored by the absorber member. An ink tank housing is provided at its upper end with an atmosphere communication opening T23, and is provided at its bottom part with an ink feed opening T24 connected to the recording head.

FIG. 3 is an external-appearance perspective view of an ink tank to which nozzles are connected. The ink tank having the form shown in FIG. 3 has an ink storage portion T31, and nozzles T32 through which the ink is to be ejected.

In the general formula (I), $R_1$ represents a hydrogen atom, an alkyl group, a hydroxy lower alkyl group, a cyclohexyl group, a monoalkylaminoalkyl or dialkylaminoalkyl group, or a cyano lower alkyl group; Y represents a chlorine atom, a hydroxyl group, an amino group, or a monoalkylamino or dialkylamino group which may have a substituent selected from the group consisting of a sulfonic group on an alkyl group, a carboxyl group and a hydroxyl group; and $R_2$, $R_3$, $R_4$, $R_5$ and $R_6$ each independently represent a hydrogen atom, an alkyl group having 1 to 8 carbon atoms, or a carboxyl group, provided that $R_2$, $R_3$, $R_4$, $R_5$ and $R_6$ cannot simultaneously represent hydrogen atoms.

General formula (II)

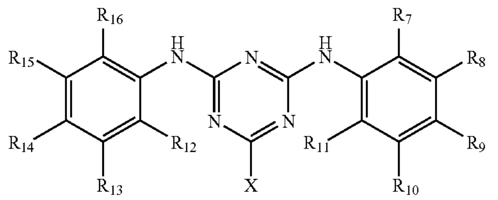

In the general formula (II), $R_7$, $R_8$, $R_9$, $R_{10}$, $R_{11}$, $R_{12}$, $R_{13}$, $R_{14}$, $R_{15}$ and $R_{16}$ each independently represent a hydrogen atom, an alkyl group having 1 to 3 carbon atoms, or a carboxyl group or a salt thereof, provided that at least two of the $R_7$, $R_8$, $R_9$, $R_{10}$, $R_{11}$, $R_{12}$, $R_{13}$, $R_{14}$, $R_{15}$ and $R_{16}$ are carboxyl groups or salts thereof; and X represents a chlorine atom, a hydroxyl group, an amino group, or a monoalkylamino or dialkylamino group having 1 to 3 carbon atoms.

The phenomenon in which the deposits having developed in the interior of the ink tank make the fine channels clog is considered to come about because a phenomenon as stated below takes place in the interior of the ink tank after the ink stored in the ink tank has been used up. The water content by the general formula (I) or a salt thereof and the compound represented by the general formula (II) are mixedly present is present in the interior of the ink tank to a certain extent, the compound represented by the general formula (I) or a salt thereof and the compound represented by the general formula (II) are improved in their affinity for each other and hence are not mutually adversely affected, so that an ink having a good ink jet suitability can be obtained, as so presumed.

Therefore, it is seen that the relation between the compound represented by the general formula (I) or a salt thereof and the compound represented by the general formula (II) satisfies the above requirements (1) to (4), which are the relations between the water-soluble coloring material and the compound which improves image fastness in the present invention. Thus, it is required for the ink tank storing therein the ink comprising the compound represented by the general formula (I) or a salt thereof and the compound represented by the general formula (II), to be usually used up, i.e., to be used only once.

(Coloring Material)

[Compound Represented by General Formula (I) or Salt thereof]

The aqueous ink (hereinafter also simply "ink") in the present invention may preferably contain as the water-soluble coloring material the compound represented by the following general formula (I) or a salt thereof.

General formula (I)

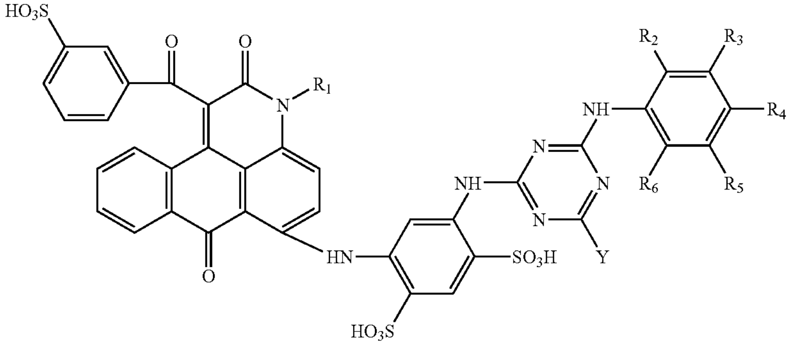

contained in the ink remaining in the interior of the ink tank decreases very quickly, and carbon dioxide in the air dissolves in the ink. Hence, for example, the pH of the ink remaining in the interior of the ink tank is brought to the acid side, and hence the compound represented by the general formula (II), having many carboxyl groups in the molecule, comes deposited predominantly in the interior of the ink tank.

In order to inspect depositing quality due to the influence of pH, the solubility in pure water with pH7 at 25° C. has been compared between the compound represented by the general formula (I) or a salt thereof and the compound represented by the general formula (II) to find that the compound represented by the general formula (II) has a lower solubility than the compound represented by the general formula (I) or a salt thereof. This fact also has supported that the compound represented by the general formula (II) has a high depositing quality.

Moreover, many moieties of the molecular structure of the compound represented by the general formula (II) are similar to part of the molecular structure of the compound represented by the general formula (I) or a salt thereof. As the result, where an ink in which both the compound represented In the general formula (I), $R_1$ represents a hydrogen atom, an alkyl group, a hydroxy lower alkyl group, a cyclohexyl group, a monoalkylaminoalkyl or dialkylaminoalkyl group, or a cyano lower alkyl group; Y represents a chlorine atom, a hydroxyl group, an amino group, or a monoalkylamino or dialkylamino group which may have a substituent selected from the group consisting of a sulfonic group, a carboxyl group and a hydroxyl group on an alkyl group; and $R_2$, $R_3$, $R_4$, $R_5$ and $R_6$ each independently represent a hydrogen atom, an alkyl group having 1 to 8 carbon atoms, or a carboxyl group, provided that $R_2$, $R_3$, $R_4$, $R_5$ and $R_6$ cannot simultaneously represent hydrogen atoms.

The following Exemplified Compounds 1 to 7 are preferred Exemplified compounds of the compound represented by the above general formula (I) or a salt thereof. Of course, in the present invention, examples are by no means limited to the following compounds. All the solubilizing groups in the following exemplified compounds are represented in H forms, but may form salts.

Exemplified compound 1
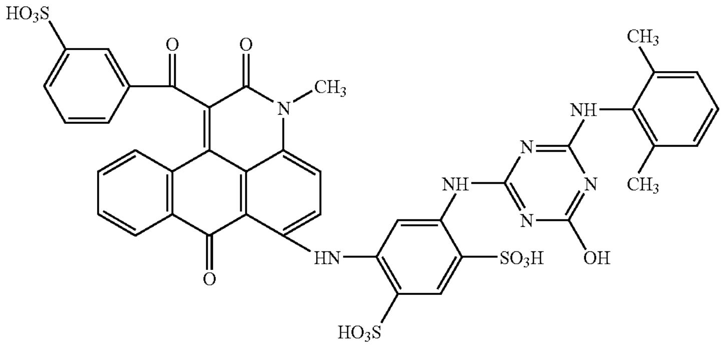
Exemplified compound 2
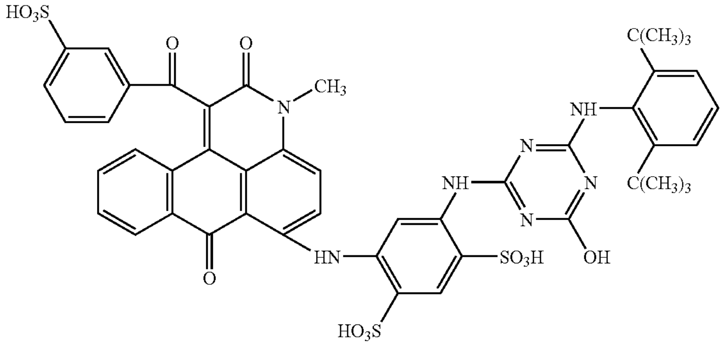
Exemplified compound 3
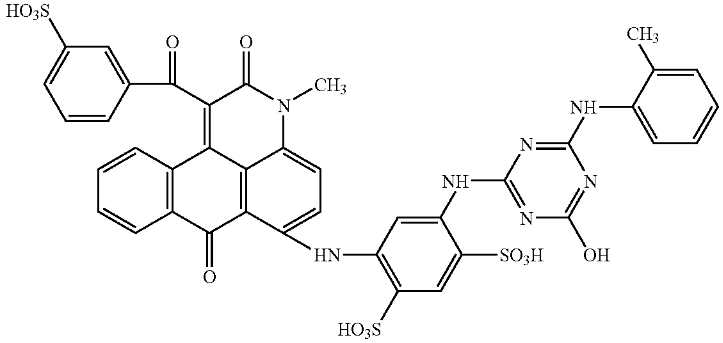
Exemplified compound 4
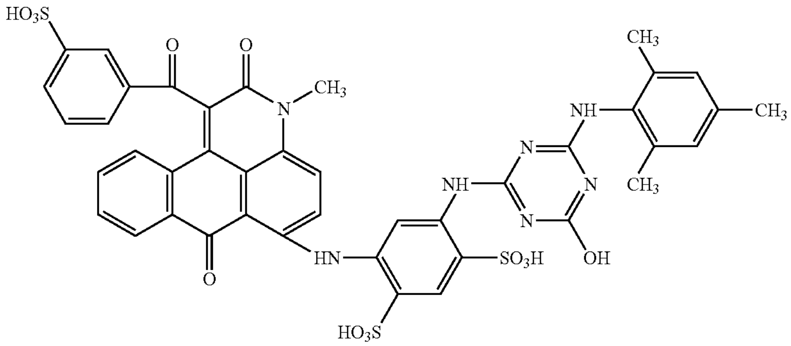

-continued

Exemplified compound 5

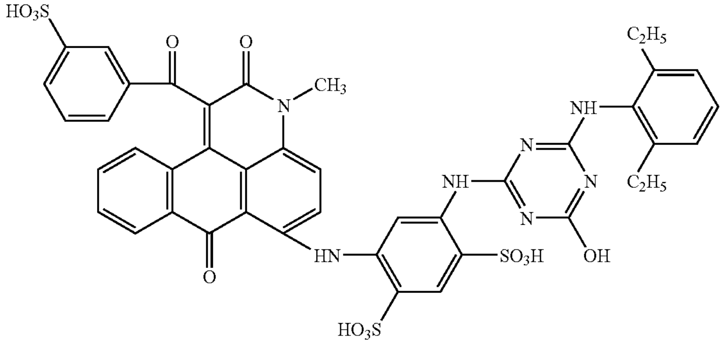

Exemplified compound 6

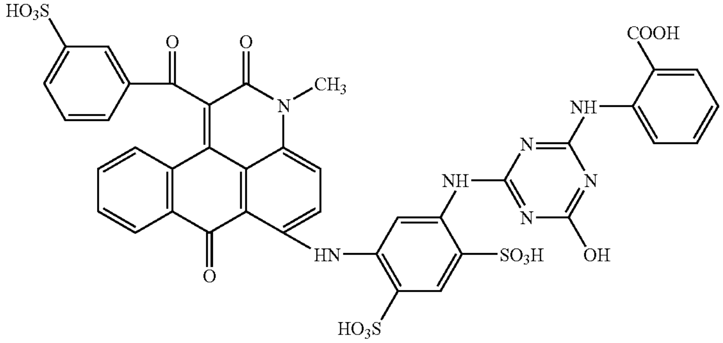

Exemplified compound 7

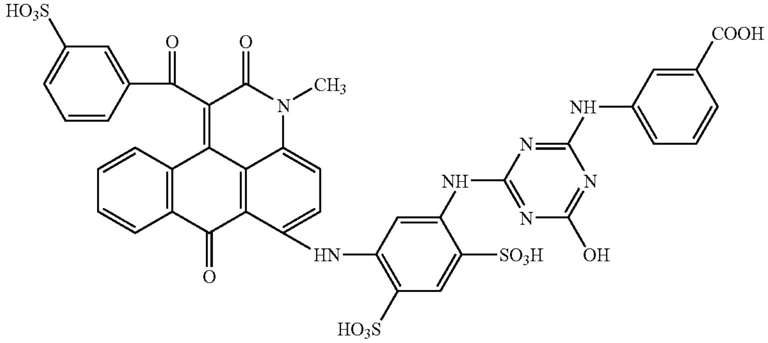

Of the above Exemplified Compounds, it is particularly preferable to use the following Exemplified Compound A, which is a sodium salt of Exemplified Compound 6.

Exemplified Compound A

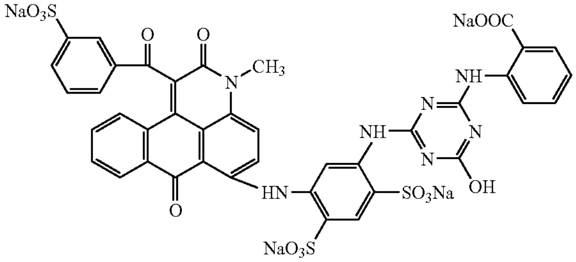

The compound represented by the general formula (I) or a salt thereof may preferably be in a content of from 0.1 mass % or more to 10.0 mass % or less with respect to the total mass of the ink. If it is in a content of less than 0.1 mass %, no sufficient image density may be achievable. If it is in a content of more than 10.0 mass %, no good ink jet performance may be achievable, e.g., sticking recovery property in recording head nozzles through which the ink is to be ejected is not achievable. However, in order to achieve a high image density, it may preferably be in a content of from 3.0 mass % or more to 10.0 mass % or less, and, in order to achieve a higher image density, it may preferably be in a content of from 4.5 mass % or more to 10.0 mass % or less.

In recent years, an ink having a low coloring material concentration, what is called a light-color ink, is also used in some cases in order that images obtained by the ink jet recording method can have image quality comparable to that of silver halide photographs. Where the ink in the present invention is used as the light-color ink, the compound represented by the general formula (I) or a salt thereof may preferably be in a content of from 0.1 mass % or more to 3.0 mass % or less with respect to the total mass of the ink. In order to make up an ink which can make recorded images have a superior graininess, it may more preferably be in a content of from 0.1 mass % or more to 2.5 mass % or less.

The compound represented by the general formula (I) or a salt thereof may be used alone, or a plurality of the same may be used in combination. Further, in the present invention, the compound represented by the general formula (I) or a salt thereof may be used alone as a coloring material, or may be used in combination with other coloring material in order to condition color tones and the like. Incidentally, in the case when the compound represented by the general formula (I) or a salt thereof and other coloring material are used in combination, these coloring materials may be contained in such a proportion that, with respect to the total mass of the ink, the content of the compound represented by the general formula (I) or a salt thereof and the content of other coloring material are in the range of from 1.0:10.0 to 10.0:1.0.

[Other Coloring Material(s)]

In the present invention, in addition to the above compounds, a coloring material other than the foregoing may also be used as a coloring material for color conditioning.

In order to form full-color images or the like, inks having color tones different from the ink in the present invention may also be used in combination. For example, they are a cyan ink, a magenta ink, a yellow ink and so forth. Inks having the same color tones as these inks and also having a low coloring material concentration, what is called light-color inks, may also be used in combination. Coloring materials of these inks having different color tones or of light-color inks may be known coloring materials, or coloring materials synthesized newly, any of which may be used.

Incidentally, where the coloring material for color conditioning is used together with the compound represented by the general formula (I) or a salt thereof, the compound represented by the general formula (I) or a salt thereof and the coloring material for color conditioning may preferably be in a total content (mass %) of from 0.1 mass % or more to 10.0 mass % or less with respect to the total mass of the ink. This is because, like the case in which the compound represented by the general formula (I) or a salt thereof is used alone, if they are in a content of less than 0.1 mass %, no sufficient image density may be achievable, and, if they are in a content of more than 10.0 mass %, no good ink jet performance may be achievable, e.g., sticking recovery property in recording head nozzles through which the ink is to be ejected is not achievable. As to the total content of coloring materials in a deep-color ink containing the coloring material for color conditioning and in the light-color ink, it comes like the case in which no color conditioning is made.

Specific examples of the coloring material for color conditioning and the coloring materials usable in other inks used together with the ink in the present invention are shown below according to color tones. Of course, in the present invention, examples are by no means limited to these.

—Yellow Coloring Material—

C.I. Direct Yellow 8, 11, 12, 27, 28, 33, 39, 44, 50, 58, 85, 86, 87, 88, 89, 98, 100, 110, 132, 173, etc.;

C.I. Acid Yellow 1, 3, 7, 11, 17, 23, 25, 29, 36, 38, 40, 42, 44, 76, 98, 99, etc.; and C.I. Pigment Yellow 1, 2, 3, 12, 13, 14, 15, 16, 17, 73, 74, 75, 83, 93, 95, 97, 98, 114, 128, 138, 180, etc.

—Magenta Coloring Material—

C.I. Direct Red 2, 4, 9, 11, 20, 23, 24, 31, 39, 46, 62, 75, 79, 80, 83, 89, 95, 197, 201, 218, 220, 224, 225, 226, 227, 228, 229, 230, etc.;

C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265, 289, etc.;

C.I. Food Red 87, 92, 94, etc.;

C.I. Direct Violet 107, etc.; and

C.I. Pigment Red 2, 5, 7, 12, 48:2, 48:4, 57:1, 112, 122, 123, 168, 184, 202, etc.

—Cyan Coloring Material—

C.I. Direct Blue 1, 15, 22, 25, 41, 76, 77, 80, 86, 90, 98, 106, 108, 120, 158, 163, 168, 199, 226, 307, etc.;

C.I. Acid Blue 1, 7, 9, 15, 22, 23, 25, 29, 40, 43, 59, 62, 74, 78, 80, 90, 100, 102, 104, 112, 117, 127, 138, 158, 161, 203, 204, 221, 244, etc.; and C.I. Pigment Blue 1, 2, 3, 15, 15:2, 15:3, 15:4, 16, 22, 60, etc.

—Orange Coloring Material—

C.I. Acid Orange 7, 8, 10, 12, 24, 33, 56, 67, 74, 88, 94, 116, 142, etc.;

C.I. Acid Red 111, 114, 266, 374, etc.;

C.I. Direct Orange 26, 29, 24, 39, 57, 102, 118, etc.;

C.I. Food Orange 3, etc.;

C.I. Reactive Orange 1, 4, 5, 7, 12, 13, 14, 15, 16, 20, 29, 30, 84, 107, etc.;

C.I. Disperse Orange 1, 3, 11, 13, 20, 25, 29, 30, 31, 32, 47, 55, 56, etc.;

C.I. Pigment Orange 43, etc.; and

C.I. Pigment Red 122, 170, 177, 194, 209, 224, etc.

—Green Coloring Material—

C.I. Acid Green 1, 3, 5, 6, 9, 12, 15, 16, 19, 21, 25, 28, 81, 84, etc.

C.I. Direct Green 26, 59, 67, etc.;

C.I. Food Green 3, etc.;

C.I. Reactive Green 5, 6, 12, 19, 21, etc.;

C.I. Disperse Green 6, 9, etc.; and

C.I. Pigment Green 7, 36, etc.

—Blue Coloring Material—

C.I. Acid Blue 62, 82, 83, 90, 104, 112, 113, 142, 203, 204, 221, 244, etc.;

C.I. Reactive Blue 49, etc.;

C.I. Acid Violet 17, 19, 48, 49, 54, 129, etc.;

C.I. Direct Violet 9, 35, 47, 51, 66, 93, 95, 99, etc.;

C.I. Reactive Violet 1, 2, 4, 5, 6, 8, 9, 22, 34, 36, etc.;

C.I. Disperse Violet 1, 4, 8, 23, 26, 28, 31, 33, 35, 38, 48, 56, etc.;

C.I. Pigment Blue 15:6, etc.; and

C.I. Pigment Violet 19, 23, 37, etc.;

—Black Coloring Material—

C.I. Direct Black 17, 19, 22, 31, 32, 51, 62, 71, 74, 112, 113, 154, 168, 195, etc.;

C.I. Acid Black 2, 48, 51, 52, 110, 115, 156, etc.;

C.I. Food Black 1, 2, etc.; and carbon black, etc.

The present inventors have revealed that, where the ink tank having fine channels which retains an aqueous ink by capillary force is used, good ink jet performance is achieved in a usual use condition and the addition of the compound represented by the general formula (II) brings an improvement in image fastness, but, after the ink has come to stand used up, the fine channels in the ink storage portion become clogged also when the water-soluble coloring material contained in the aqueous ink is not the compound represented by the general formula (I) or a salt thereof but other water-soluble coloring material, as long as the ink is an ink having a compound which has a relatively lower molecular weight than the water-soluble coloring material, a relatively lower solubility in pure water with pH7 at 25° C. than the water-soluble coloring material, and a molecular structure represented by the above general formula (II). Thus, taking account of the foregoing, it is important for such an ink tank as well to be used up without being refilled.

[Compound Represented by the General Formula (II)]

The ink according to the present invention may preferably contain the compound represented by the following general formula (II) or a salt thereof.

General formula (II)

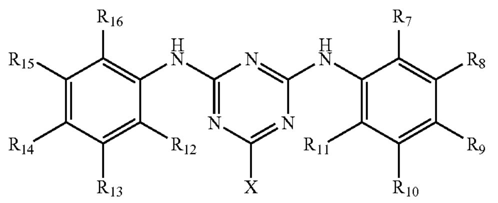

In the general formula (II), $R_7$, $R_8$, $R_9$, $R_{10}$, $R_{11}$, $R_{12}$, $R_{13}$, $R_{14}$, $R_{15}$ and $R_{16}$ each independently represent a hydrogen atom, an alkyl group having 1 to 3 carbon atoms, or a carboxyl group or a salt thereof, provided that at least two of the $R_7$, $R_8$, $R_9$, $R_{10}$, $R_{11}$, $R_{12}$, $R_{13}$, $R_{14}$, $R_{15}$ and $R_{16}$ are carboxyl groups or salts thereof; and X represents a chlorine atom, a hydroxyl group, an amino group, or a monoalkylamino or dialkylamino group having 1 to 3 carbon atoms.

In the present invention, the compound represented by the general formula (II) functions as a compound for improving image fastness. From the viewpoint of the improvement in image fastness, the compound represented by the general formula (II) may preferably be made present in the vicinity of the surface of a recording medium. As stated previously, it is presumed that, after the ink has impacted on the recording medium, the water content in the ink decreases or the pH of the ink is brought to the acid side, whereby the compound having carboxyl groups in a large number, i.e., the compound which improves image fastness predominantly comes deposited and present in the vicinity of the surface of the recording medium, and this enables improvement in image fastness. Accordingly, it is particularly preferable for the compound represented by the general formula (II), to have a structure wherein, on each of the phenyl groups at both terminals in its molecular structure, a carboxyl group, i.e., two carboxyl groups in total, is/are substituted. Then, where the number of carboxyl group per molecule in the compound represented by the general formula (II) is 2 as stated above, the number of carboxyl group per molecule in the compound represented by the general formula (I) or a salt thereof must be 1 or less.

It is further preferable that the compound represented by the general formula (II) is used in the form of an alkali metal salt. It is still further preferable that the alkali metal is sodium from the viewpoint of the balance of ink ejection stability with solubility of compounds in ink. As a preferred specific example of the compound represented by the general formula (II), it may include the following Exemplified Compound B.

Exemplified Compound B

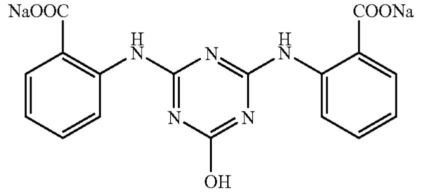

Since the compound represented by the general formula (II) has carboxyl groups in the molecule, its solubility in the ink may lower when the pH of the ink is on a strongly acid side, and hence the pH of the ink may preferably be adjusted within the range where the compound represented by the general formula (II) can stably be dissolved. On the other hand, taking account of ink resistance of members constituting an ink jet recording apparatus, difficulties may come about when the pH of the ink is on a strongly basic side. Accordingly, it is preferable that the ink has a pH at 25° C. of from 4.0 or more to 10.5 or less and also the compound represented by the general formula (II) is in a content of from 0.02 mass % or more to 2.1 mass % or less with respect to the total mass of the ink, in order that, even where the ink must be stored for a long term as in the ink tank used in ink jet recording, the compound represented by the general formula (II) may not come deposited in the interior of the ink tank before the ink is used up, to achieve good printing performance.

[Method of Testing Compound Represented by the General Formula (I) or a Salt Thereof and the Compound Represented by the General Formula (II)]

The compound represented by the general formula (I) or a salt thereof and the compound represented by the general formula (II) to be used in the present invention can be tested by following methods (1) to (3) each of which involves the use of high performance liquid chromatography (HPLC).

(1) Retention time of a peak (2) Maximum absorption wavelength in the peak of (1)

(3) M/Z (posi, nega) of mass spectrum in the peak of (1)

Analysis conditions for high performance liquid chromatography are as shown below. An ink solution diluted about 1,000 times with pure water is analyzed by means of high performance liquid chromatography under the following conditions to measure the retention time of a peak and the maximum absorption wavelength of a peak.

Column: Symmetry C18 2.1 mm×150 mm

Column temperature: 40° C.

Flow rate: 0.2 ml/min

PDA: 210 nm to 700 nm

Mobile phase and gradient condition: Table 1

TABLE 1

| | 0-5 min | 5-40 min | 40-45 min |
|---|---|---|---|
| A: Water | 85% | 85% → 0% | 0% |
| B: Methanol | 10% | 10% → 95% | 95% |
| C: Aqueous 0.2 mol/l ammonium acetate solution | 5% | 5% | 5% |

In addition, analysis conditions for mass spectrum are as shown below. The mass spectrum of the resultant peak is measured under the following conditions, and the most strongly detected M/Z is measured for each of posi and nega.

| Ionization method | | |
|---|---|---|
| ESI | Capillary voltage | 3.5 kV |
| | Desolvating gas | 300° C. |
| | Ion source temperature | 120° C. |
| Detector | posi | 40 V 200-1,500 amu/0.9 sec |
| | nega | 40 V 200-1,500 amu/0.9 sec |

Table 2 shows the values of the retention time, maximum absorption wavelength, M/Z(posi), and M/Z(nega) of, for example, each of Exemplified Compound A and Exemplified Compound B described above. When a compound has the values shown in Table 2, the compound can be determined to be the compound to be used in the present invention.

TABLE 2

| | Retention time | Maximum absorption wavelength | M/Z | |
|---|---|---|---|---|
| | (min) | (nm) | Positive | Negative |
| Exemplified Compound A: | 21-23 | 530-550 | 941-944 | 469-471 |
| Exemplified Compound B: | 22.5-24.5 | 270-290 | 367-369 | 365-367 |

(Aqueous Medium)

The aqueous ink used in the ink tank of the present invention may use water or an aqueous medium which is a mixed solvent of water and a water-soluble organic solvent of various types.

As the water-soluble organic solvent, there are no particular limitations thereon as long as it is water-soluble. Usable are alkyl alcohols having 1 to 4 carbon atoms, such as ethanol, isopropanol, n-butanol, isobutanol, secondary butanol and tertiary butanol; carboxylic acid amides such as N,N-dimethylformamide and N,N-dimethylacetamide; ketones such as acetone, methyl ethyl ketone and 2-methyl-2-hydroxypentan-4-one; or cyclic ethers such as ketoalcohol, tetrahydrofuran and dioxane; polyhydric alcohols such as glycerol, ethylene glycol, diethylene glycol, triethylene glycol, tetraethylene glycol, 1,2- or 1,3-propylene glycol, 1,2- or 1,4-butylene glycol, polyethylene glycol, 1,3-butanediol, 1,5-pentanediol, 1,2-hexanediol, 1,6-hexanediol, dithioglycol, 2-methyl-1,3-propanediol, 1,2,6-hexanetriol, acetylene glycol derivatives, and trimethylolpropane; alkyl ethers of polyhydric alcohols, such as ethylene glycol monomethyl(or -ethyl) ether, diethylene glycol monomethyl(or -ethyl) ether and triethylene glycol monoethyl(or -butyl) ether; heterocyclic rings such as 2-pyrrolidone, N-methyl-2-pyrrolidone, 1,3-diemthyl-2-imidazolidinone and N-methylmorpholine; sulfur-containing compounds such as dimethyl sulfoxide; and urea and urea derivatives. The water-soluble organic solvent may used alone, or may be used in the form of a mixture.

Any of these water-soluble organic solvents may preferably be in a content of from 5 mass % to 90 mass %, and more preferably from 10 mass % to 50 mass %, with respect to the total mass of the ink. This is because, if it is in a content of less than this range, reliability such as ejection performance may come poor when used for ink jet recording, and, if it is in a content of more than this range, the ink has so high a viscosity that faulty ink feeding may come about.

As the water, it is preferable to use deionized water (ion-exchanged water) . The water may preferably be in a content of from 10 mass % to 90 mass % with respect to the total mass of the ink.

(Other Additives)

In the present invention, the ink may further be incorporated with various additives such as a surfactant, a pH adjuster, a rust preventive, an antiseptic agent, a mildew-proofing agent, a chelating agent, a rust preventive, an ultraviolet absorber, a viscosity modifier, an anti-foaming agent and a water-soluble polymer.

The surfactant may specifically include, e.g., anionic surfactants, amphoteric surfactants, cationic surfactants and nonionic surfactants.

The anionic surfactants may specifically include, e.g., alkylsulfocarboxylates, α-olefin sulfonates, polyoxyethylene alkyl ether acetates, N-acylamino acid and salts thereof, N-acylmethyl taurine salt, alkyl sulfate polyoxyalkyl ether sulfates, alkyl sulfate polyoxyethylene alkyl ether sulfates, alkyl sulfate polyoxyethylene alkyl ether phosphates, rosined soap, castor oil sulfuric ester salts, lauryl alcohol sulfuric ester salts, alkylphenol type phosphates, alkyl type phosphates, alkylallyl sulfonates, diethyl sulfosuccinates, diethylhexyl sulfosuccinate dioctyl sulfosuccinates.

The cationic surfactants may specifically include, e.g., 2-vinylpyridine derivatives and poly(4-vinylpyridine) derivatives. The amphoteric surfactants may specifically include, e.g., betaine lauryldimethylaminoacetate, 2-alkyl-N-carboxymethyl-N-hydroxyethyl imidazolinium betaine, polyoctyl polyaminethyl glycine, and besides imidazoline derivatives.

The nonionic surfactants may specifically include, e.g., ether types such as polyoxyethylene nonyl phenyl ether, polyoxyethylene octyl phenyl ether, polyoxyethylene dodecyl phenyl ether, polyoxyethylene lauryl ether, polyoxyethylene oleyl ether, polyoxyethylene alkyl ethers, and polyoxyethylene allylalkyl ethers; ester types such as polyoxyethylene oleic acid, polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; acetylene glycol types such as 2,4,7,9-tetramethyl-5-decyne-4,7-diol, 3,6-dimethyl-4-octyne-3,6-diol, and 3,5-dimethyl-1-hexyne-3,6-ol (e.g., ACETYLENOL EH, available from Kawaken Fine Chemicals Co., Ltd.; and SURFINOL 104, 82, 465, OLFINE STG, available from Nisshin Chemical Co., Ltd.).

As the pH adjuster, any substance may be used as long as it can control the pH of the ink within the stated range. It may specifically include, e.g., alcohol amine compounds such as diethanolamine, triethanolamine, isopropanolamine and tris (hydroxymethyl)aminomethane; alkali metal hydroxides such as lithium hydroxide, potassium hydroxide and ammonium hydroxide; and alkali metal carbonates such as lithium carbonate, sodium carbonate and potassium carbonate.

The rust preventive or antiseptic agent may specifically include, e.g., compounds of an organic sulfurous type, an organic nitrogen sulfurous type, an organohalogen type, a haloallylsulfone type, an iodopropargyl type, an N-haloalkylthio type, a benzthiazole type, a nitrile type, a pyridine type, an 8-oxyquinoline type, a benzothiazole type, an isothiazoline type, a dithiol type, a pyridine oxide type, a nitropropane type, an organotin type, a phenol type, a quaternary ammonium salt type, a triazine type, a thiadiazine type, an anilide type, an adamantane type, a dithiocarbamate type, a brominated indanone type, a benzyl bromoacetate type and an inorganic salt type.

The organohalogen type compound may include, e.g., sodium pentachlorophenol; the pyridine oxide type compound may include, e.g., sodium 2-pyridinethiol-1 oxide; the inorganic salt type compound may include, e.g., anhydrous sodium acetate; and the isothiazoline type compound may include 1,2-benzisothiazolin-3-one, 2-n-octyl-4-isothiazolin-3-one, 5-chloro-2-methy-4-isothiazolin-3-one, 5-chloro-2-methy-4-isothiazolin-3-one magnesium chloride, and 5-chloro-2-methy-4-isothiazolin-3-one calcium chloride. Other mildew-proofing agent or antiseptic agent may specifically include, e.g., sodium sorbate and sodium benzoate, and also, e.g., PROXEL GXL (S) and PROXEL XL-2 (S), available from Avecia.

The chelating agent may include, e.g., sodium citrate, sodium ethylenediamine tetraacetate, sodium dinitrotriacetate, sodium hydroxyethylenediamine triacetate, sodium diethylenetriamine pentaacetate, and sodium uramildiacetate.

The rust preventive may include, e.g., acid sulfites, sodium thiosulfate, ammonium thioglycolate, diisopropylammonium nitrite, pentaerythritol tetranitrate, and dicyclohexylammonium nitrite.

As the ultraviolet absorber, also usable are what is called fluorescent whitening agents, which are compounds capable of absorbing ultraviolet radiations to emit fluorescence, as typified by benzophenone type compounds, benzotriazol type compounds, cinnamic acid type compounds, triazine type compounds, stilbene type compounds, or benzoxazole type compounds.

The viscosity modifier may include, besides the water-soluble organic solvents, water-soluble polymeric compounds, and may include, e.g., polyvinyl alcohol, cellulose derivatives, polyamines and polyimines.

As the anti-foaming agent, fluorine type or silicone type compounds may optionally be used.

<Recording Medium>

As the recording medium used when images are formed using the aqueous ink filled in the ink tank of the present invention, any one may be used as long as it is a recording medium to which the ink is applied to perform recording.

The present invention is especially preferable where a recording medium in which a coloring material such as a pigment is absorbed into the fine particles of an ink receiving layer that form a porous structure and images are formed at least from such pigment-absorbed fine particles is used and the ink jet recording is employed. Such a recording medium for ink jet recording may preferably be of what is called an absorption type in which the ink is absorbed by voids formed in an ink receiving layer provided on a support.

The absorption type ink receiving layer is constituted as a porous layer formed chiefly of fine particles and optionally containing a binder and other additives. The fine particles may specifically include, e.g., inorganic pigments such as silica, clay, talc, calcium carbonate, caolin, aluminum oxide such as alumina or alumina hydrate, diatomaceous earth powder, titanium oxide, hydrotalcite and zinc oxide; and organic pigments such as urea formalin resins, ethylene resins and styrene resins. At least one of these may be used. What is preferably used as the binder may include water-soluble high polymers or latexes. For example, usable are polyvinyl alcohol or modified products thereof, starch or modified products thereof, gelatin or modified products thereof, gum arabic, cellulose derivatives such as carboxymethyl cellulose, hydroxyethyl cellulose and hydroxypropyl methyl cellulose, vinyl copolymer latexes such as SBR latex, NBR latex, methyl methacrylate-butadiene copolymer latex, functional group modified polymer latex and ethylene-vinyl acetate copolymer latex, polyvinyl pyrrolidone, maleic anhydride or copolymers thereof, acrylate copolymers, and so forth. Any two or more of these may optionally be used in combination. Besides, additives may also be used. For example, optionally usable are a dispersing agent, a thickening agent, a pH adjuster, a lubricant, a fluidity modifier, a surfactant, an anti-foaming agent, a release agent, a fluorescent brightener, an ultraviolet absorber and an antioxidant.

In particular, a recording medium preferably used in the present invention is a recording medium in which an ink receiving layer is formed which is formed chiefly of fine particles having an average particle diameter of 1 μm or less. Such fine particles may include, as particularly preferable ones, e.g., fine silica particles and fine aluminum oxide particles. Those preferable as the fine silica particles are fine silica particles typified by colloidal silica. The colloidal silica itself is commercially available. In particular, preferred are those disclosed in, e.g., Japanese Patents No. 2803134 and No. 2881847. Those preferable as the fine aluminum oxide particles are fine alumina hydrate particles and the like. One of such fine alumina hydrate particles may include alumina hydrates represented by the following general formula.

$$Al_2O_{3-n}(OH)_{2n}\cdot mH_2O$$

In the above formula, n represents an integer of 1, 2 or 3, and m represents a value of 0 to 10, and preferably 0 to 5, provided that m and n are not 0 at the same time. In many cases, $mH_2O$ represents even an eliminable aqueous phase not participating in the formation of $mH_2O$ crystal lattices, and hence m may take an integer or a value which is not an integer. Also, it is possible that m reaches the value of 0 upon heating of the material of this type.

The alumina hydrate may be produced by a known method such as hydrolysis of an aluminum alkoxide or hydrolysis of sodium aluminate as disclosed in U.S. Pat. Nos. 4,242,271 and 4,202,870, or a method in which an aqueous solution of sodium sulfate, aluminum chloride or the like is added to an aqueous solution of sodium aluminate to effect neutralization as disclosed in Japanese Patent Publication No. S57-044605.

The recording medium may preferably have a support for supporting the ink receiving layer. There are no particular limitations on the support and any support may be used, as long as it affords a rigidity that is enough for the ink receiving layer to be formable of the above porous fine particles and for the recording medium to be transportable by a transport mechanism of an ink jet printer or the like. Stated specifically, it may include, e.g., paper supports made of pulp raw materials, composed chiefly of natural cellulose fibers; plastic supports made of materials such as polyester (e.g., polyethylene terephthalate), cellulose triacetate, polycarbonate, polyvinyl chloride, polypropylene and polyimide; and resin coated paper having on at least one side of base paper a polyolefin resin coated, resin coated layer to which a white pigment or the like has been added (e.g., RC paper).

<Ink Jet Recording Method>

The ink used in the ink tank of the present invention may particularly preferably be used in an ink jet recording method including ejecting the ink by ink jet method. The ink jet recording method includes a recording method in which mechanical energy is made to act on an ink to eject the ink, and a recording method in which thermal energy is made to act on an ink to eject the ink. In particular, the ink jet recording method making use of thermal energy may preferably be used in the present invention.

<Recording Unit>

A recording unit preferable in recording performed using the ink filled in the ink tank of the present invention may include a recording unit having an ink storage portion for storing therein the ink and a recording head. In particular, it may include a recording unit in which the recording head causes heat energy corresponding to recording signals, to act on the ink to produce ink droplets by that energy.

<Ink jet Recording Apparatus>

A recording apparatus preferable in recording performed using the ink filled in the ink tank of the present invention may include an apparatus in which heat energy corresponding to recording signals is applied to an ink stored in a chamber of a recording head having an ink storage portion for storing therein the ink, to produce ink droplets by that energy.

Outline construction of the mechanics of an ink jet recording apparatus is described below. The recording apparatus main body is, from function of each mechanism, constituted of a sheet feed part, a sheet transport part, a carriage part, a sheet delivery part, a cleaning part, and an exterior housing which protects these and provides design quality. These are described below in order.

Figure 4:
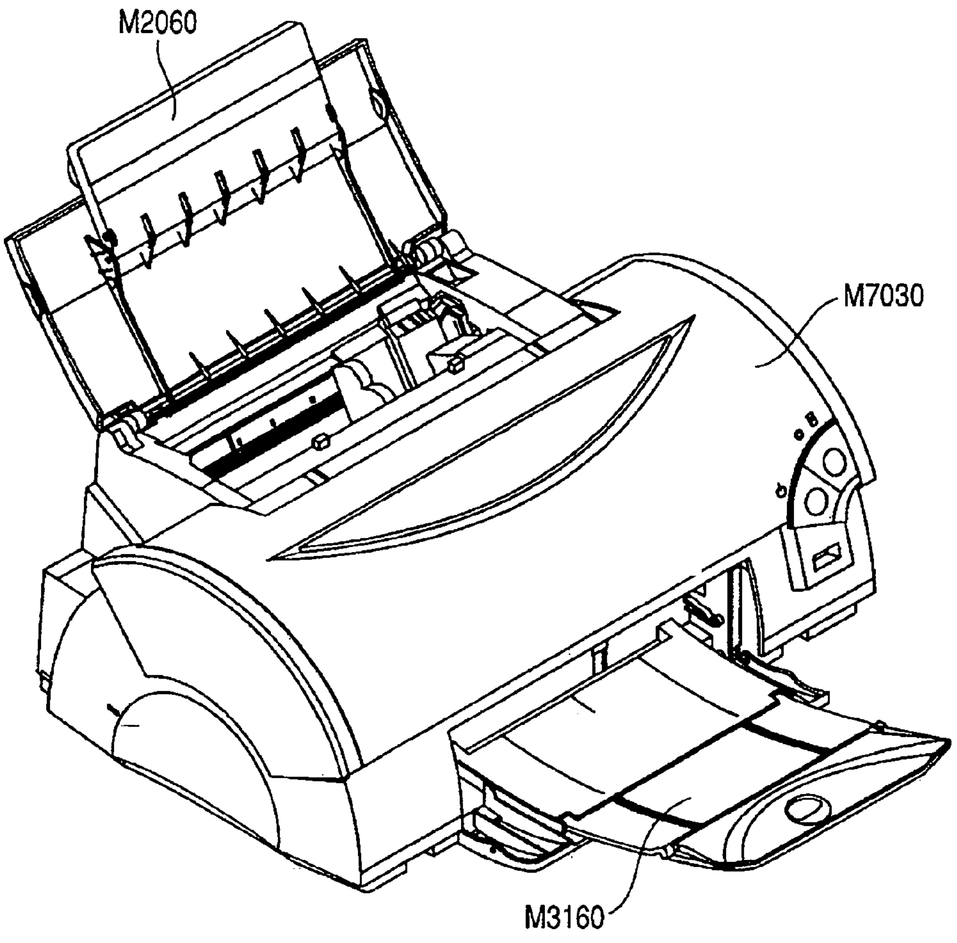
FIG. 4 is a perspective view of a recording apparatus.
Figure 5:
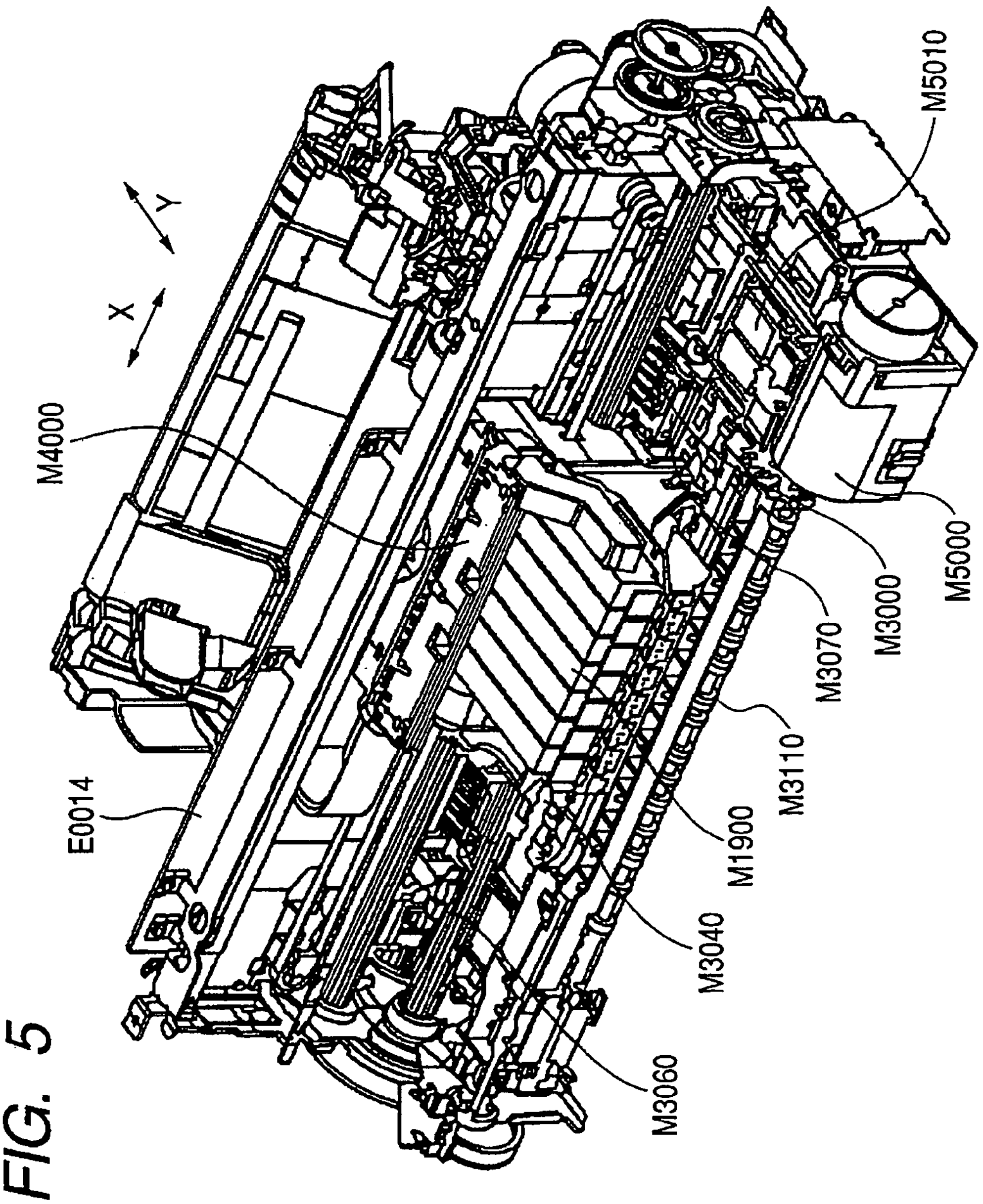
FIG. 5 is a perspective view of the mechanics of the recording apparatus.
Figure 6:
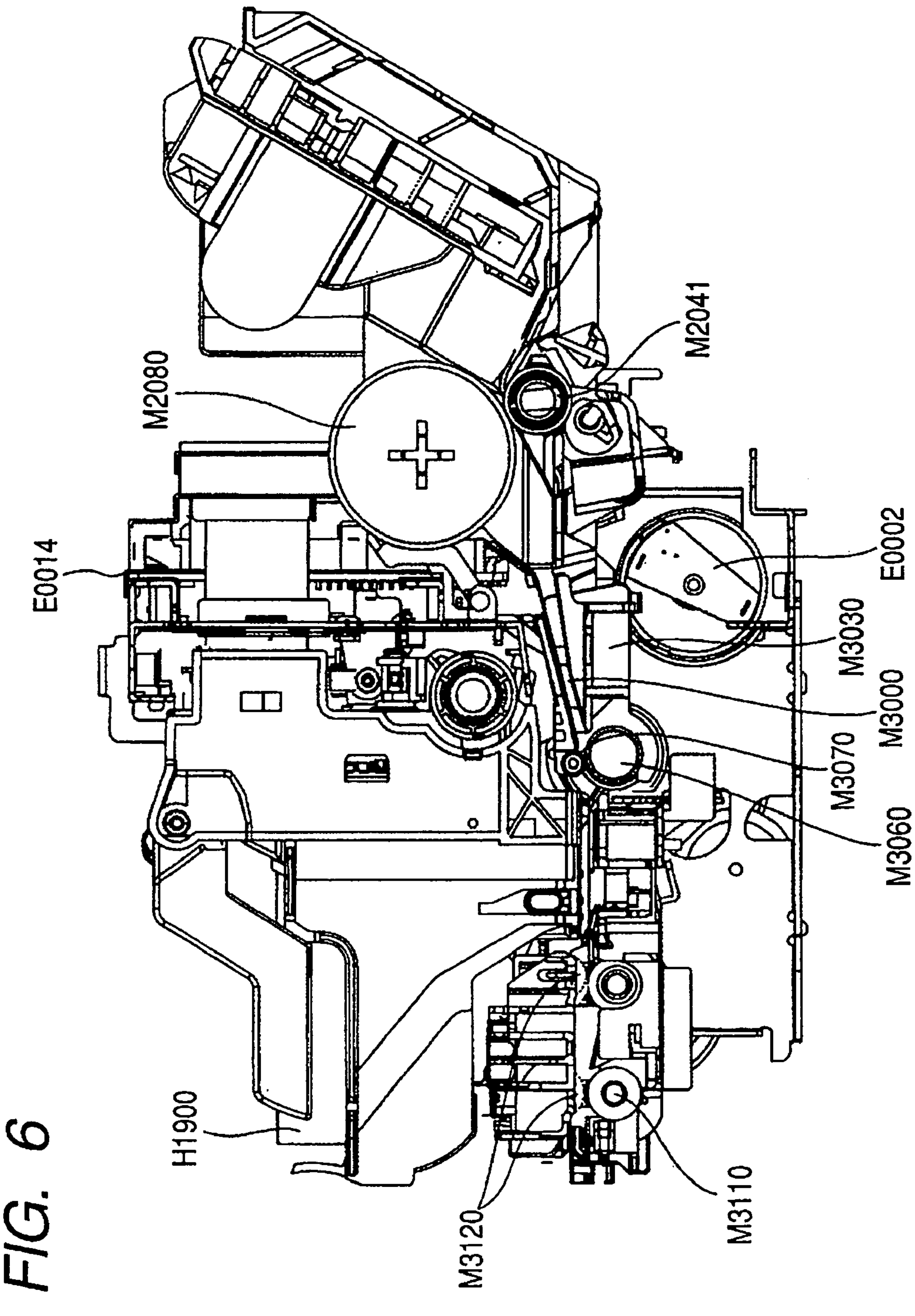
FIG. 6 is a sectional view of the recording apparatus.

FIG. 4 is a perspective view of the recording apparatus. FIG. 5 and FIG. 6 are views to illustrate the internal structure of the recording apparatus main body. FIG. 5 and FIG. 6 are a perspective view as viewed form the upper right and a sectional side view, respectively, of the recording apparatus main body.

When recording sheets are fed in the recording apparatus, first, in the sheet feed part, having a sheet feed tray M2060, only a stated number of sheets of recording mediums are fed to a nip zone formed by a sheet feed roller M2080 and a separation roller M2041. The recording medium thus fed are separated at the nip zone, and only the uppermost-positioned recording medium is transported. The recording medium sent to the sheet transport part is guided by a pinch roller holder M3000 and a sheet guide flapper M3030, and is sent to a pair of rollers, a transport roller M3060 and a pinch roller M3070. The pair of rollers consisting of the transport roller M3060 and the pinch roller M3070 are rotated by the drive of an LF motor E0002, and the recording medium is transported over a platen M3040 by this rotation.

In the carriage part, when images are formed on the recording medium, a recording head H1001 (FIG. 7) is set at the intended image forming position, and ejects ink against the recording medium in accordance with signals sent form an electric circuit board E0014. The recording head H1001, details of the construction of which are as described later, is so constructed that, while recording is performed by the recording head H1001, a carriage M4000 alternately repeats the recording primary scanning in which the carriage M4000 is scanned in the column direction and the secondary scanning in which the recording medium is transported in the row direction by the transport roller M3060, whereby images are formed on the recording medium.

The recording medium on which the images have finally been formed is inserted in and transported through a nip between a first sheet delivery roller M3110 and a spur M3120 at the sheet delivery part and is delivered to a sheet delivery tray M3160.

Incidentally, at the cleaning part, for the purpose of cleaning the recording head H1001 before and after image recording, it is so designed that a pump M5000 is operated in the state a cap M5010 is brought into close contact with ink ejection orifices of the recording head H1001, whereupon unnecessary ink and so forth are soaked up from the recording head H1001. It is also so designed that, in the state the cap M5010 is opened, the ink remaining on the cap M5010 is soaked up so that the sticking due to residual ink and any difficulties subsequent thereto may not occur.

Recording Head Construction

A head cartridge H1000 is constructed as described below. The head cartridge H1000 has a means for mounting the recording head H1001 and ink tanks denoted collectively as H1900, and a means for feeding inks from the ink tanks H1900 to the recording head. It is detachably mounted to the carriage M4000.

Figure 7:
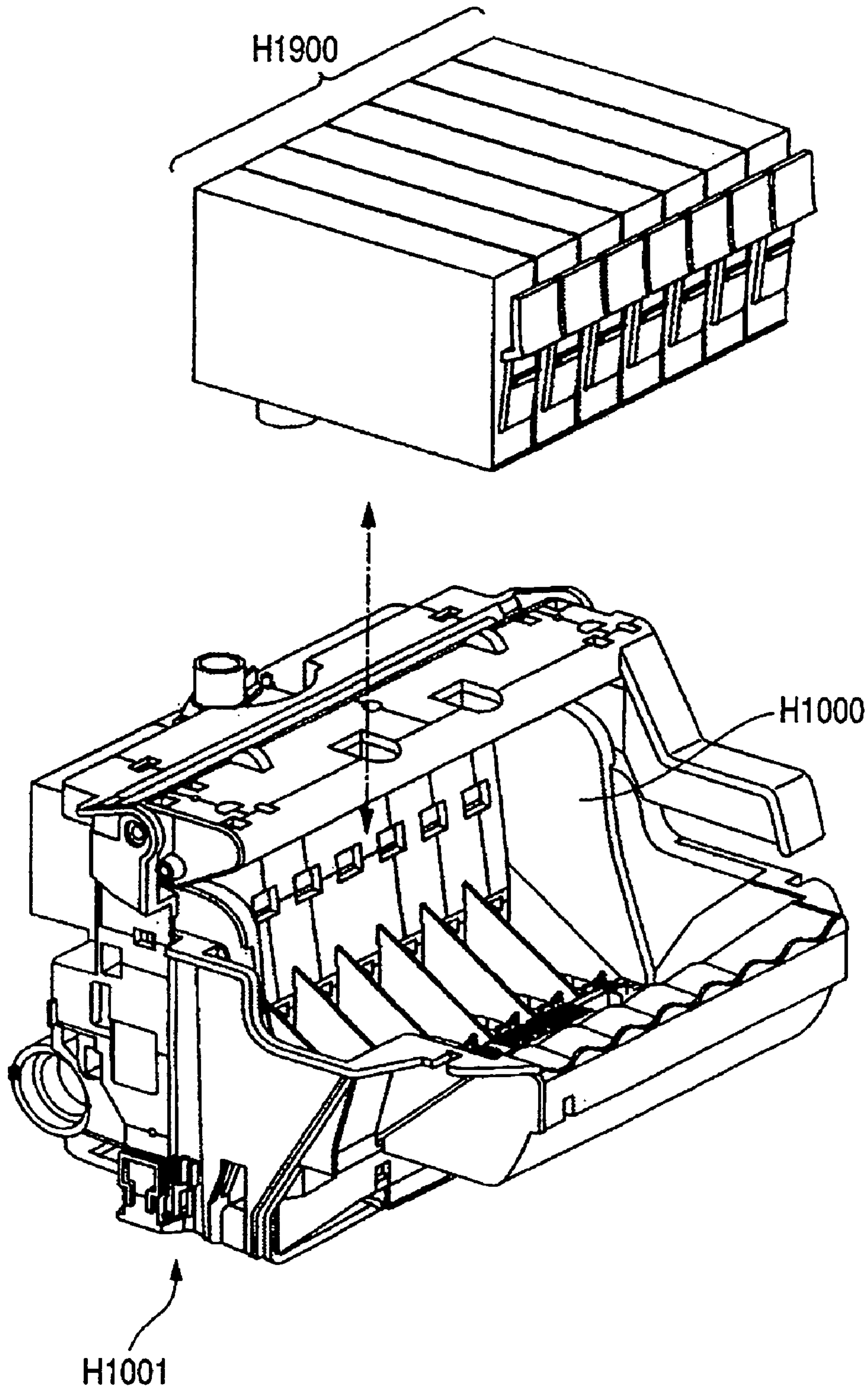
FIG. 7 is a perspective view showing how ink tanks are attached to a head cartridge.

FIG. 7 illustrates how the ink tanks H1900 are attached to the head cartridge H1000. The recording apparatus forms images using yellow, magenta, cyan, black, photo magenta, photo cyan and green inks. Accordingly, the ink tanks H1900 as well are independently readied for seven colors. In the foregoing, the ink according to the present invention is used in at least one ink. Then, as shown in the drawing, each tank is set detachably to the head cartridge H1000. Incidentally, the ink tanks H1900 are so designed that they can be attached or detached in the state the head cartridge H1000 is mounted to the carriage M4000.

Figure 8:
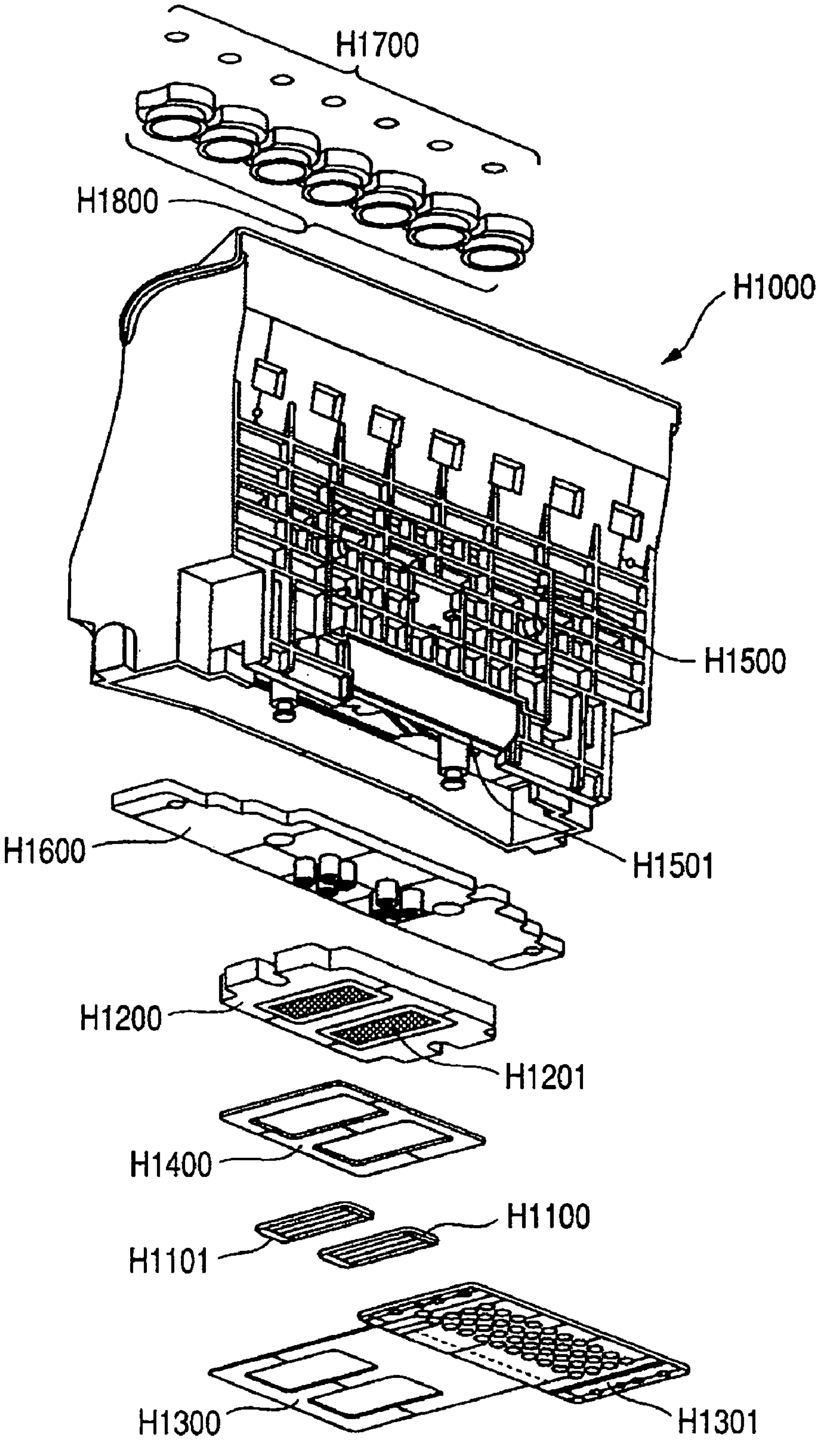
FIG. 8 is an exploded perspective view of the head cartridge.

FIG. 8 is an exploded perspective view of the head cartridge H1000. In the drawing, the head cartridge H1000 is constituted of a first recording element circuit board H1100, a second recording element circuit board H1101, a first plate H1200, a second plate H1400, an electric wiring circuit board H1300, a tank holder H1500, a channel forming member H1600, filters H1700, seal rubbers H1800 and so forth.

The first recording element circuit board H1100 and the second recording element circuit board H1101 each comprise a silicon substrate on one side of which a plurality of recording elements (nozzles) have been formed by photolithography. Al or the like electric wiring through which electric power is supplied to each recording element is formed by a film-forming technique. A plurality of ink channels corresponding to the individual recording elements are also formed by photolithography. Further, ink feed openings for feeding inks to the plurality of ink channels are so formed that they open on the back.

Figure 9:
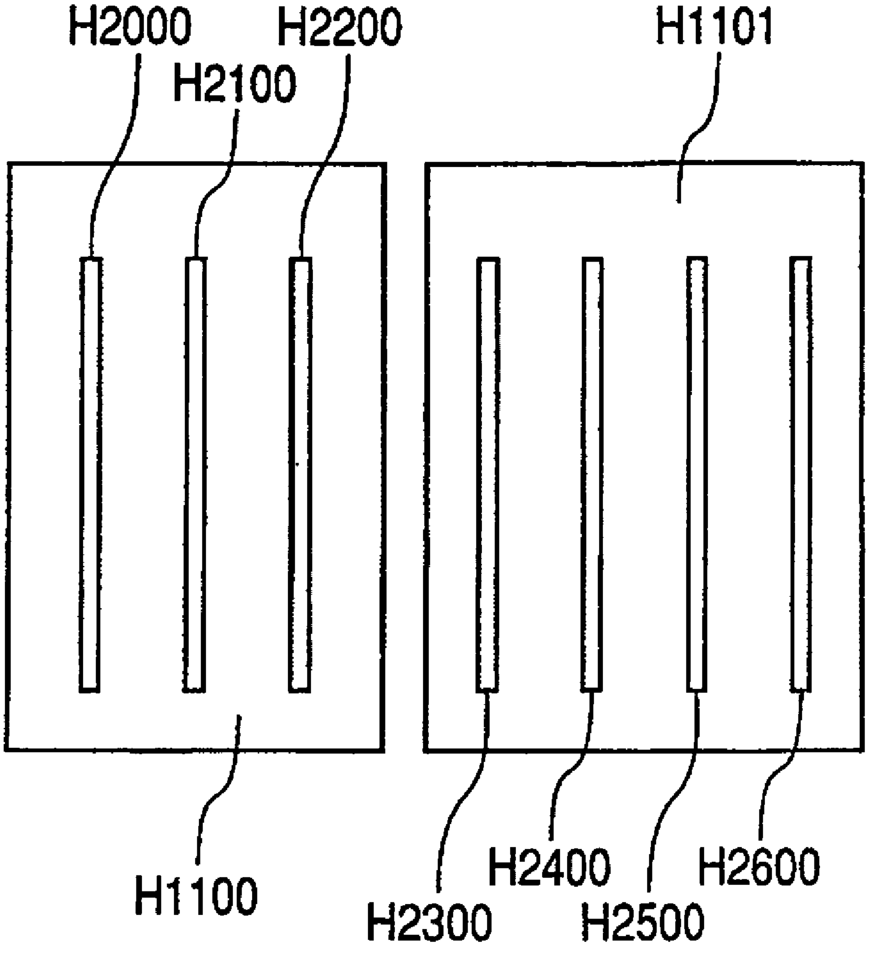
FIG. 9 is a front view showing a recording element substrate of the head cartridge.

FIG. 9 is an enlarged front view to illustrate the construction of the first recording element circuit board H1100 and second recording element circuit board H1101. Reference numerals H2000 to H2600 denote columns of recording elements (hereinafter also "nozzle column(s)") corresponding to the respective different ink colors. In the first recording element circuit board H1100, nozzle columns for three colors are set up as a nozzle column H2000 to which the yellow ink is fed, a nozzle column H2100 to which the magenta ink is fed and a nozzle column H2200 to which the cyan ink is fed. In the second recording element circuit board H1101, nozzle columns for four colors are set up as a nozzle column H2300 to which the photo cyan ink is fed, a nozzle column H2400 to which the black ink is fed, a nozzle column H2500 to which the orange ink is fed and a nozzle column H2600 to which the photo magenta ink is fed.

Each nozzle column is constituted of 768 nozzles arranged at intervals of 1,200 dpi (dot/inch) in the direction of transport of the recording medium, and ink droplets of about 2 picoliters are ejected therefrom. The opening area at each nozzle ejection orifice is set to be about 100 square micrometers ($\mu m^2$). Also, the first recording element circuit board H1100 and the second recording element circuit board H1101 are fastened to the first plate H1200 by bonding. In this plate, an ink feed opening H1201 is formed through which the ink is fed to the first recording element circuit board H1100 and second recording element circuit board H1111.

The second plate H1400, having openings, is further fastened by bonding to the first plate H1200. This second plate H1400 holds the electric wiring circuit board H1300 so that the electric wiring circuit board H1300, the first recording element circuit board H1100 and the second recording element circuit board H1101 are electrically connected.

The electric wiring circuit board H1300 is that which applies electric signals for ejecting the inks from the respective nozzles formed in the first recording element circuit board H1100 and second recording element circuit board H1101. It has electric wiring corresponding to the first recording element circuit board H1100 and second recording element circuit board H1101, and an external signal input terminal H1301 which is positioned at an end portion of this electric wiring and through which the electric signals from the recording apparatus main body are received. The external signal input terminal H1301 is fastened under registration to the tank holder H1500 on its back side.

Meanwhile, to the tank holder H1500 which holds the ink tanks H1900, the channel forming member H1600 is fastened by, e.g., ultrasonic welding to form ink channels H1501 which lead from the ink tanks H1900 to the first plate H1200.

At ink tank side end portions of the ink channels H1501 engaging with the ink tanks H1900, filters denoted collectively as H1700 are provided so that any dust and dirt can be prevented from coming in from the outside. Seal rubbers denoted collectively as H1800 are also fitted at the part where the ink channels H1501 engage with the ink tanks H1900 so that the inks can be prevented from evaporating through the part of engagement. The ink tank according to the present invention is used in at least one of the ink tanks H1900.

The tank holder part constituted of the tank holder H1500, the channel forming member H1600, the filters H1700 and the seal rubbers H1800 as described above is further joined by bonding or the like to the recording head H1001 constituted of the first recording element circuit board H1100, the second recording element circuit board H1101, the first plate H1200, the electric wiring circuit board H1300 and the second plate H1400. Thus, the head cartridge H1000 is set up.

Incidentally, the recording head has been described here taking the case of, as a form thereof, a recording head of BUBBLE JET (registered trademark) system which performs recording by the use of an electricity-heat converter (a recording element) which generates heat energy for causing film boiling on an ink in accordance with electric signals.

As its typical construction and principles, preferred is a system which performs recording by the use of basic principles disclosed in, e.g., U.S. Pat. Nos. 4,723,129 and 4,740,796. This system is applicable to any of what are called an on-demand type and a continuous type. In particular, in the case of the on-demand type, this system is effective because at least one drive signal corresponding to recording information and giving rapid temperature rise that exceeds nucleate boiling is applied to an electricity-heat converter disposed correspondingly to a sheet or liquid channel where a liquid (ink) is stored, to generate heat energy in the electricity-heat converter to cause film boiling on the heat-acting face of a recording head, and consequently bubbles in the liquid (ink) can be formed one to one correspondingly to this drive signal. The growth and shrinkage of the bubbles cause the liquid (ink) to eject through ejecting openings to form at least one droplet. Where this drive signal is applied in a pulse form, the growth and shrinkage of the bubbles take place instantly and appropriately, and hence the ejection of liquid (ink) in an especially good response can be achieved, thus this is more preferred.

As a form of an ink jet recording apparatus that utilizes second mechanical energy, it may also include an on-demand ink jet recording head which is provided with a nozzle-formed substrate having a plurality of nozzles, a pressure generating device composed of a piezoelectric material and a conductive material, provided opposingly to the nozzles, and an ink with which the surrounding of the pressure generating device is filled, and in which the pressure generating device is made to undergo displacement by an applied voltage to eject minute ink drops from the nozzles.

The ink jet recording apparatus is not limited to the one in which the head and the ink tanks are separately set up, and may also be one making use of them set integral unseparably. Also, the ink tanks may be, besides those which are set integral separably or unseparably from a head and mounted to a carriage, those having a form in which they are provided at a stationary portion of the apparatus and feed inks to a recording head through an ink feeding member, e.g., tubes. Further, where an ink tank is provided with a structure for causing negative pressure to act on a recording head, employable is a form in which an absorber is disposed in an ink storage portion of the ink tank, or a form in which the ink tank has a flexible ink storing bag and a spring member which makes a pressing force act on the bag in the direction where its internal volume is expanded. Also, the recording apparatus may be, besides the one employing a serial recording system as described above, one having a form of a line printer in which recording elements are arrayed over the range corresponding to the whole width of a recording medium.

<How to Regenerate Ink Tank>

As stated previously, where the compound represented by the general formula (II) has come deposited in the interior of the ink tank, in particular, in the fine channels after the ink stored in the ink tank of the present invention has been used up, and the fine channels has become clogged, it is impossible to re-dissolve the deposits even if the ink tank is washed with water or the like available for general users. Then, even if the ink tank being in such a state is refilled with an ink and put to use, no good ink jet performance is achievable because the fine channels stand clogged.

The present inventors have made studies on the ink tank being in such a state. As the result, they have found that the compound represented by the general formula (II) having come deposited in the interior of the ink tank can be dissolved by washing the interior of the ink tank, using as an ink tank regenerating solution an aqueous solution having a pH of 10.0 or more. Then, it has turned out that the printing can normally be performed when the interior of the ink tank of the present invention is washed with the ink tank regenerating solution, thereafter the ink tank is refilled with an ink and then printing is performed using the ink tank. That is, an ink tank that has been impossible to reuse because of the presence of the deposits, namely, has had to be used only once can be regenerated by washing the ink tank with the ink tank regenerating solution in the present invention. Incidentally, what is meant by the condition that the pH of the ink tank regenerating solution is 10.0 or more is that an ink tank regenerating solution having a pH of 10 or more from the beginning immediately after its preparation may be used, or that even an ink tank regenerating solution having a pH of less than 10 at the beginning immediately after its preparation may be used as long as it comes to have the pH of 10.0 or more because of, e.g., changes in liquid temperature.

Taking account of ink resistance of members constituting the ink tank, difficulties may come about when the pH of the ink is on a strongly basic side. Accordingly, it is preferable for the ink tank regenerating solution to have a pH of 11 or less. It is also preferable that, after the ink tank has been washed with the ink tank regenerating solution, the interior of the ink tank is optionally further washed with a liquid having a pH of from 6 to 8.

As a component of the ink tank regenerating solution used in the ink tank regeneration process of the present invention, any substance may be used as long as it can be removed by dissolving the deposits having developed in the interior of the ink tank and also it by no means lower ink jet suitability against materials of the members constituting the ink tank. Stated specifically, usable are an aqueous solution of an alkali metal hydroxide such as lithium hydroxide, sodium hydroxide or potassium hydroxide and an aqueous ammonia solution the pH of each of which has been adjusted to 10.0 or more. Also, in order to make the ink tank regenerating solution penetrate through the fine channels of the ink tank, the surface tension of the ink tank regenerating solution may optionally be controlled using a water-soluble organic solvent, a surfactant or the like.

In the ink tank regeneration process of the present invention, after the compound represented by the general formula (II) having come deposited in the interior of the ink tank has been removed by dissolving the same, the ink tank may be refilled with any desired aqueous ink. Even in such a case, good ink jet suitability is achievable. Also, in the case when the ink tank is refilled with any desired aqueous ink, the component of the ink tank regenerating solution may preferably be selected from substances which do not lower ink jet suitability also against the aqueous ink with which the ink tank is refilled. Still also, the ink tank may be filled with an ink having a pH of 10.0 or more which is used as the ink tank regenerating solution to dissolve the compound represented by the general formula (II), and thereafter may be used as an ink as it is.

In the ink tank regeneration process of the present invention, the ink tank has an information holding means which records information on ink consumption in an initializable state, and the information holding means may be initialized to bring the ink tank into a serviceable condition.

As the means for holding the information on ink consumption, usable are known means as exemplified by a means in which a memory is installed in the ink tank and the information on ink consumption is recorded in the memory, and a mechanical means such that the ink tank has a lever, where the lever is kept down during usual recording and the lever ascends when the ink is used up, to inhibit the ink jet recording apparatus from operating.

An example of such a system for holding the information on ink consumption is shown in FIG. 1 in respect of a case in which a chip having memory function is installed in the ink tank. The ink tank 100 is set in an ink jet recording apparatus P and the recording is performed, whereupon the information on ink consumption is read by a dot counter DC provided in the ink jet recording apparatus P. The information on ink consumption is transmitted as input information I from the ink jet recording apparatus P to a memory M of the chip installed in the ink tank 100, and is recorded in the memory M. The ink stored in the ink tank 100 decreases as being used in the recording, to come into the state the ink has been used up, whereupon, from the ink tank holding the information on ink consumption, the output information U is transmitted to the ink jet recording apparatus P, so that an ink judgement means X of the ink jet recording apparatus P works to inhibit the ink jet recording apparatus P from operating for recording. In this case, by the ink tank regeneration process of the present invention, the memory M of the chip installed in the ink tank 100 is initialized so that the ink tank 100 can be mounted again to the ink jet recording apparatus P and can be used again.

EXAMPLES

Hereinafter, the present invention will be described in more detail by way of Examples and Reference Examples. The present invention is by no means limited by the following Examples unless it is beyond its gist. Incidentally, the amounts of ink components in Examples and Reference Examples are each meant by "part(s) by mass" unless particularly noted. In the present Examples, the ink jet recording method, in which inks are required to have severer properties than inks commonly used, is employed to give description. Of course, subjects of common ink tanks should be considered understandable from the following Examples.

<Preparation of Coloring Material Which is a Compound Represented by General Formula (I) or a Salt Thereof>

Compound (1) shown below, sodium carbonate and ethyl benzoyl acetate was allowed to react to one another in xylene, and the reactant was filtered and washed. To the resultant, were sequentially added with m-amino acetanilide, copper acetate, and sodium carbonate in N,N-dimethylformamide to carry out a reaction, and the reactant was filtered and washed. The resultant was sulfonated in fuming sulfuric acid, and the resultant was filtered and washed. The resultant was subjected to a condensation reaction with cyanuric chloride in the presence of sodium hydroxide. Anthranilic acid was added to the reaction liquid to carry out a condensation reaction in the presence of sodium hydroxide. The resultant was filtered and washed to prepare Exemplified Compound A shown below.

Compound (1)

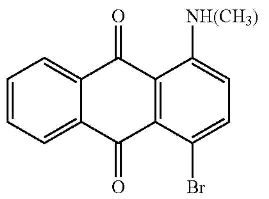

Exemplified Compound A

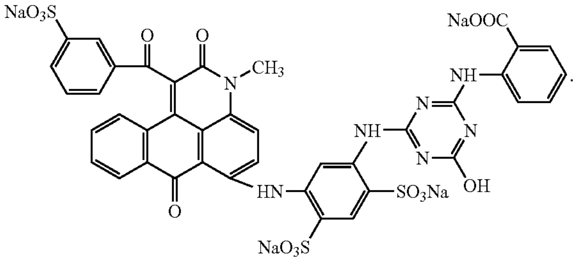

<Preparation of Compound Represented by General Formula (II)>

The compound represented by the general formula (II) can be prepared by a conventionally known method. Here, an example of a method of synthesizing Exemplified Compound B shown below as an example of the compound represented by the general formula (II) will be described.

An aqueous solution of anthranilic acid was added to a suspension of cyanuric chloride, and the mixture was subjected to a condensation reaction in the presence of sodium hydroxide to prepare a condensate having two molecules of anthranilic acid condensed with one molecule of cyanuric chloride. Further, sodium hydroxide was added thereto and the mixture was heated to carry out a hydrolysis reaction. Then, the mixture was filtered and washed to prepare Exemplified Compound B shown below.

Exemplified Compound B

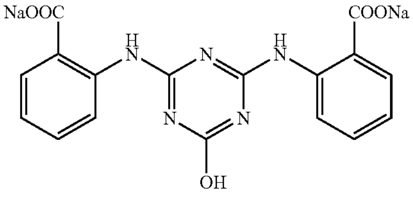

<Preparation of Ink>

The respective components shown in Table 3 below were mixed and thoroughly stirred, followed by pressure filtration carried out using a filter of 0.2 μm in pore size to prepare Inks 1 to 4. Incidentally, Inks 1 to 3are those to which the above Exemplified Compound B was added, and Ink 4 is one to which the above Exemplified Compound B was not added. The pH values of the inks are also shown in Table 3 below. The pH was adjusted with pure water to which sodium hydroxide or sulfuric acid was added.

TABLE 3

| | Ink | | | |
|---|---|---|---|---|
| | 1 | 2 | 3 | 4 |
| Glycerol: | 10.00 | 10.00 | 10.00 | 10.00 |
| Ethylene glycol: | 10.00 | 10.00 | 10.00 | 10.00 |
| Urea: | 5.00 | 5.00 | 5.00 | 5.00 |
| N-methyl-2-pyrrolidone: | 5.00 | 5.00 | 5.00 | 5.00 |
| ACETYLENOL E100 (*): | 1.00 | 1.00 | 1.00 | 1.00 |
| Exemplified Compound A: | 5.00 | 5.00 | 5.00 | 5.00 |
| Exemplified Compound B: | 2.00 | 1.10 | 0.02 | 0.00 |
| Pure water (**): | 62.00 | 62.90 | 63.98 | 64.00 |
| pH: | 10.5 | 9.0 | 4.0 | 7.0 |

(*): an acetylene glycol ethylene oxide adduct (surfactant available from Kawaken Fine Chemicals Co., Ltd.)
(**): total of pure water and sodium hydroxide, or total of pure water and sulfuric acid, or pure water alone.

Here, the following can be said in respect of the relation between Exemplified Compound A and Exemplified Compound B.

(1) The molecular weight of Exemplified Compound B is less than the molecular weight of Exemplified Compound A.

(2) Part of molecular structure of Exemplified Compound B is similar to part of molecular structure of Exemplified Compound A.

(3) The number of carboxyl groups per molecule of Exemplified Compound B is more than the number of carboxyl groups per molecule of Exemplified Compound A.

Studies made by the present inventors also ascertained the following.

(4) The solubility of Exemplified Compound B in pure water with pH 7 at 25° C. is lower than the solubility of Exemplified Compound A in pure water with pH7 at 25° C.

<Evaluation of Ink Tank>

An empty ink tank (trade name: BCI-6, manufactured by CANON INC.) was filled with each of the inks obtained above. Using a thermal ink jet printer in which heat energy is applied to the ink to eject ink droplets, and mounting the ink tank filled with these inks each at the position of magenta ink, evaluation was made on the following items.

(1) Printing Performance after Refilling with Ink

Using the above printer, various images were printed on recording mediums (trade name: PR-101, available from CANON INC.) under conditions of a temperature of 23° C. and a relative humidity of 55%, and the ink in the ink tank was used up. Thereafter, the ink tank was detached from the printer, and was left for 1 month under conditions of a temperature of 23° C. and a relative humidity of 55%. Further thereafter, the ink tank was again filled with the same ink as the above, and was set in the printer, where various images were printed on recording mediums (trade name: PR-101, available from CANON INC.), and image quality level was visually judged. Criteria of the printing performance after refilling with ink are as shown below. The results of evaluation are shown in Table 4.

A: Good printing was partly not performable.

B: Good printing was performable.

TABLE 4

| | Example | | | Ref. |
|---|---|---|---|---|
| | 1<br>Ink 1 | 2<br>Ink 2 | 3<br>Ink 3 | Example 1<br>Ink 4 |
| Printing performance after refilling with ink: | A | A | A | B |

As can be seen from the above Table 4, the ink tank filled with the ink to which Exemplified Compound B is added causes a difficulty in printing when the ink tank is refilled with the ink after the ink has been used up. That is, where the ink tank of the present invention is used, the ink tank should not be refilled with ink, namely, ink refilling should not be carried out, and it is indispensable for the ink tank to be used only once, i.e., to be used up.

Incidentally, the various images printed as above were placed in a low-temperature cycle xenon weatherometer XL-75C (manufactured by Suga Test Instruments Co., Ltd.), and left for a week under conditions of an irradiation intensity of 100 killolux, a temperature-in-chamber of 23° C. and a relative humidity of 55%. As the result, the images printed using Inks 1 to 3 were found undoubtedly lower in the degree of deterioration than the images printed using Ink 4.

(2) Regeneration of Ink Tank

Using the above printer, various images were printed on recording mediums (trade name: PR-101, available from CANON INC.) under conditions of a temperature of 23° C. and a relative humidity of 55%, and the ink in the ink tank was used up. Thereafter, the ink tank was detached from the printer, and was left for 1 month under conditions of a temperature of 23° C. and a relative humidity of 55%. Further thereafter, an ink tank regenerating solution shown in Table 5 below was prepared as the ink tank regenerating solution, and, the ink tank regenerating solution was repeatedly filled in and discharged from the ink tank five times. Thereafter, the ink tank was again filled with the same ink as the above, and was set in the printer, where various images were printed on recording mediums (trade name: PR-101, available from CANON INC.), and image quality level was visually judged. Criteria of the printing performance after refilling with ink are as shown below. The results of evaluation are shown in Table 6.

A: Good printing was performable.

B: Good printing was not performable.

TABLE 5

| Ink tank regenerating solution | |
|---|---|
| ACETYLENOL E100: | 1.00 |
| Total of pure water and sodium hydroxide: | 99.00 |
| pH: | 10.0 |

TABLE 6

| | Example | | | Ref. |
|---|---|---|---|---|
| | 4<br>Ink 1 | 5<br>Ink 2 | 6<br>Ink 3 | Example 2<br>Ink 4 |
| Regeneration of ink tank: | A | A | A | A |

As can be seen from the above Table 6 and Table 4, even the ink tank filled with the ink showing no good printing performance after refilling with ink can be reused as long as the ink tank is washed with the ink tank regenerating solution having composition shown in Table 5.

This application claims priorities from Japanese Patent Application No. 2004-228230 filed on Aug. 4, 2004 and Japanese Patent Application No. 2005-224240 filed on Aug. 2, 2005, which are hereby incorporated by reference herein.

What is claimed is:

1. An ink tank which comprises an ink storage portion for storing an aqueous ink therein, having fine channels which retain the aqueous ink by capillary force, wherein:

the aqueous ink comprises at least water and a water-soluble coloring material; and the aqueous ink further comprises a compound satisfying the following requirements (1) to (4):

Requirement (1): a molecular weight of the compound is less than a molecular weight of the water-soluble coloring material;

Requirement (2): part of a molecular structure of the compound is similar to part of a molecular structure of the water-soluble coloring material;

Requirement (3): the number of carboxyl groups per molecule of the compound is more than the number of carboxyl groups per molecule of the water-soluble coloring material; and Requirement (4): a solubility of the compound in pure water with pH 7 at 25° C. is lower than the solubility of the water-soluble coloring material in pure water with pH 7 at 25° C.

2. The ink tank according to claim 1, which comprises a negative-pressure generation mechanism at least at some part of the ink storage portion, and retains the aqueous ink by negative pressure generated by the negative-pressure generation mechanism.

3. The ink tank according to claim 1, which comprises nozzles through which the aqueous ink is ejected.

4. The ink tank according to claim 1, wherein the water-soluble coloring material comprises a compound represented by the following general formula (I) or a salt thereof:

General formula (I)

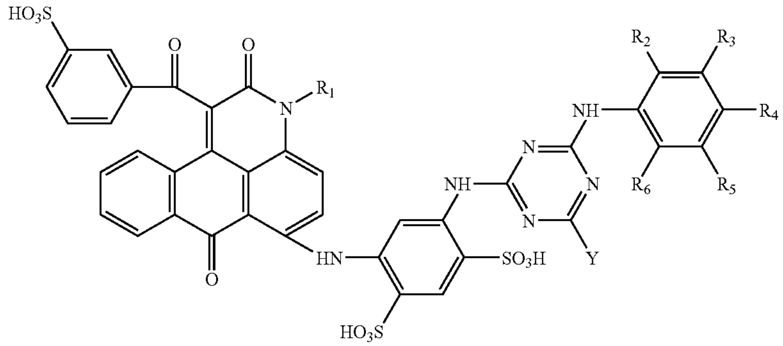

wherein $R_1$ represents a hydrogen atom, an alkyl group, a hydroxy lower alkyl group, a cyclohexyl group, a monoalkylaminoalkyl or dialkylaminoalkyl group, or a cyano lower alkyl group; Y represents a chlorine atom, a hydroxyl group, an amino group, or a monoalkylamino or dialkylamino group which may have a substituent selected from the group consisting of a sulfonic group, a carboxyl group and a hydroxyl group on an alkyl group; and $R_2$, $R_3$, $R_4$, $R_5$ and $R_6$ each independently represent a hydrogen atom, an alkyl group having 1 to 8 carbon atoms, or a carboxyl group, provided that $R_2$, $R_3$, $R_4$, $R_5$ and $R_6$ cannot simultaneously represent hydrogen atoms.

5. The ink tank according to claim 1, wherein the compound comprises a compound represented by the following general formula (II):

General formula (II)

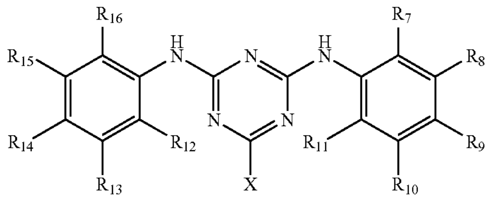

wherein $R_7$, $R_8$, $R_9$, $R_{10}$, $R_{11}$, $R_{12}$, $R_{13}$, $R_{14}$, $R_{15}$ and $R_{16}$ each independently represent a hydrogen atom, an alkyl group having 1 to 3 carbon atoms, or a carboxyl group or a salt thereof, provided that at least two of the $R_7$, $R_8$, $R_9$, $R_{10}$, $R_{11}$, $R_{12}$, $R_{13}$, $R_{14}$, $R_{15}$ and $R_{16}$ are carboxyl groups or salts thereof; and X represents a chlorine atom, a hydroxyl group, an amino group, or a monoalkylamino or dialkylamino group having 1 to 3 carbon atoms.

6. An ink tank which comprises an ink storage portion storing an aqueous ink therein, having fine channels which retain the aqueous ink by capillary force, wherein:

the aqueous ink comprises at least water and a water-soluble coloring material;

the water-soluble coloring material comprises a compound represented by the following general formula (I) or a salt thereof; and the aqueous ink further comprises a compound represented by the following general formula (II):

General formula (I)

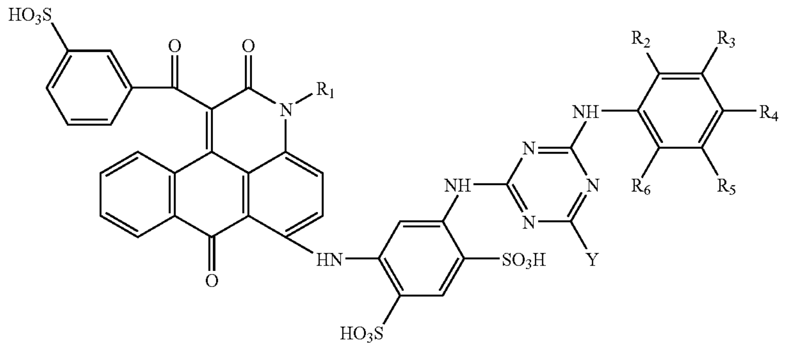

wherein $R_1$ represents a hydrogen atom, an alkyl group, a hydroxy lower alkyl group, a cyclohexyl group, a monoalkylaminoalkyl or dialkylaminoalkyl group, or a cyano lower alkyl group; Y represents a chlorine atom, a hydroxyl group, an amino group, or a monoalkylamino or dialkylamino group which may have a substituent selected from the group consisting of a sulfonic group, a carboxyl group and a hydroxyl group on an alkyl group; and $R_2$, $R_3$, $R_4$, $R_5$ and $R_6$ each independently represent a hydrogen atom, an alkyl group having 1 to 8 carbon atoms, or a carboxyl group, provided that $R_2$, $R_3$, $R_4$, $R_5$ and $R_6$ cannot simultaneously represent hydrogen atoms; and General formula (II)

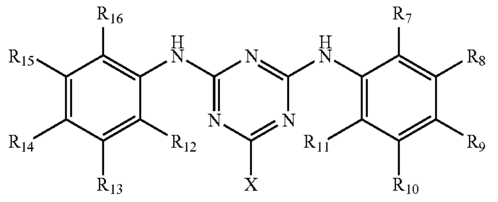

wherein $R_7$, $R_8$, $R_9$, $R_{10}$, $R_{11}$, $R_{12}$, $R_{13}$, $R_{14}$, $R_{15}$ and $R_{16}$ each independently represent a hydrogen atom, an alkyl group having 1 to 3 carbon atoms, or a carboxyl group or a salt thereof, provided that at least two of the $R_7$, $R_8$, $R_9$, $R_{10}$, $R_{11}$, $R_{12}$, $R_{13}$, $R_{14}$, $R_{15}$ and $R_{16}$ are carboxyl groups or salts thereof; and X represents a chlorine atom, a hydroxyl group, an amino group, or a monoalkylamino or dialkylamino group having 1 to 3 carbon atoms.

7. The ink tank according to claim 6, wherein, in the general formula (II), one of $R_7$ and $R_{11}$ is a carboxyl group or a salt thereof and the other is a hydrogen atom, one of $R_{12}$ and $R_{16}$ is a carboxyl group or a salt thereof and the other is a hydrogen atom, and all the $R_8$, $R_9$, $R_{10}$, $R_{11}$, $R_{13}$, $R_{14}$ and $R_{15}$ are hydrogen atoms, and X is a hydroxyl group.

8. An ink tank which comprises an ink storage portion storing an aqueous ink therein, having fine channels which retain the aqueous ink by capillary force, wherein:

the aqueous ink comprises at least water and a water-soluble coloring material, and the aqueous ink further comprises a compound represented by the following general formula (II):

General formula (II)

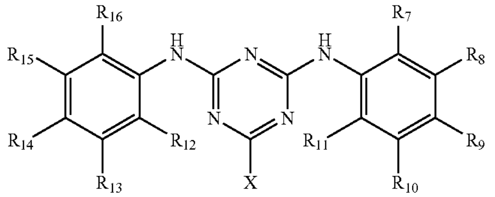

wherein $R_7$, $R_8$, $R_9$, $R_{10}$, $R_{11}$, $R_{12}$, $R_{13}$, $R_{14}$, $R_{15}$ and $R_{16}$ each independently represent a hydrogen atom, an alkyl group having 1 to 3 carbon atoms, or a carboxyl group or a salt thereof, provided that at least two of the $R_7$, $R_8$, $R_9$, $R_{10}$, $R_{11}$, $R_{12}$, $R_{13}$, $R_{14}$, $R_{15}$ and $R_{16}$ are carboxyl groups or salts thereof; and X represents a chlorine atom, a hydroxyl group, an amino group, or a monoalkylamino or dialkylamino group having 1 to 3 carbon atoms.

9. The ink tank according to claim 1, wherein, where the compound is a solid, the compound is able to be dissolved using an aqueous solution having a pH of 10.0 or more.

10. An ink jet recording method, comprising ejecting an ink by ink jet method, wherein the ink comprises an aqueous ink stored in an ink storage portion of the ink tank according to claim 1.

11. An ink tank regeneration process for regenerating an ink tank which comprises an ink storage portion storing an aqueous ink therein, having fine channels which retain the aqueous ink by capillary force;

the aqueous ink comprising at least water and a water-soluble coloring material;

the aqueous ink further comprising, as a compound satisfying the following requirements (1) and (2), a compound represented by the following general formula (II); and the process comprising a dissolution step of dissolving the compound, which has become deposited in the interior of the ink tank, by the use of an aqueous solution having a pH of 10.0 or more:

Requirement (1): a molecular weight of the compound represented by the general formula (II) is less than a molecular weight of the water-soluble coloring material; and Requirement (2): the compound represented by the general formula (II) has lower solubility in pure water with pH 7 at 25° C., than the water-soluble coloring material:

General formula (II)

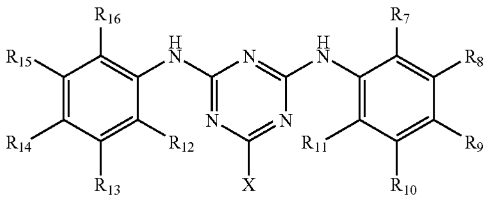

wherein $R_7$, $R_8$, $R_9$, $R_{10}$, $R_{11}$, $R_{12}$, $R_{13}$, $R_{14}$, $R_{15}$ and $R_{16}$ each independently represent a hydrogen atom, an alkyl group having 1 to 3 carbon atoms, or a carboxyl group or a salt thereof, provided that at least two of the $R_7$, $R_8$, $R_9$, $R_{10}$, $R_{11}$, $R_{12}$, $R_{13}$, $R_{14}$, $R_{15}$ and $R_{16}$ are carboxyl groups or salts thereof; and X represents a chlorine atom, a hydroxyl group, an amino group, or a monoalkylamino or dialkylamino group having 1 to 3 carbon atoms.

12. The ink tank regeneration process according to claim 11, which comprises a refilling step of refilling the ink tank with the aqueous ink after the dissolution step has been carried out.

13. The ink tank regeneration process according to claim 11, wherein the ink tank has an information holding means which holds information on ink consumption in an initializable state, and the process comprises the step of initializing the information holding means to bring the ink tank into a serviceable condition.

14. An ink jet recording method, comprising ejecting an ink by ink jet method, wherein the ink comprises an aqueous ink stored in an ink storage portion of an ink tank having been regenerated by the ink tank regeneration process according to claim 11.

* * * * *